(12) United States Patent
Wong et al.

(10) Patent No.: US 11,774,685 B2
(45) Date of Patent: Oct. 3, 2023

(54) ADAPTER FOR OPTICAL CONNECTORS

(71) Applicant: Senko Advanced Components, Inc., Marlborough, MA (US)

(72) Inventors: Kim Man Wong, Kowloon (HK); Jeffrey Gniadek, Oxford, ME (US); Kazuyoshi Takano, Tokyo (JP); Siu Kei Ma, Kowloon (HK)

(73) Assignee: Senko Advanced Components, Inc, Hudson, MA (US)

( * ) Notice: Subject to any disclaimer, the term of this patent is extended or adjusted under 35 U.S.C. 154(b) by 0 days.

(21) Appl. No.: 17/733,865

(22) Filed: Apr. 29, 2022

(65) Prior Publication Data

US 2022/0252797 A1  Aug. 11, 2022

Related U.S. Application Data

(63) Continuation of application No. 17/375,856, filed on Jul. 14, 2021, now Pat. No. 11,333,836, which is a continuation of application No. 17/200,134, filed on Mar. 12, 2021, now Pat. No. 11,181,701, which is a continuation of application No. 16/297,607, filed on Mar. 9, 2019, now Pat. No. 10,976,505, which is a continuation of application No. PCT/US2018/016049, filed on Jan. 30, 2018.

(60) Provisional application No. 62/581,961, filed on Nov. 6, 2017, provisional application No. 62/546,920, filed on Aug. 17, 2017, provisional application No. 62/485,042, filed on Apr. 13, 2017, provisional application No. 62/463,898, filed on Feb. 27, 2017, provisional application No. 62/457,150, filed on Feb. 9, 2017, provisional application No. 62/452,147, filed on Jan. 30, 2017.

(51) Int. Cl.
    G02B 6/38  (2006.01)

(52) U.S. Cl.
    CPC ......... G02B 6/3893 (2013.01); G02B 6/3821 (2013.01); G02B 6/3879 (2013.01)

(58) Field of Classification Search
    CPC ... G02B 6/3893; G02B 6/3821; G02B 6/3879
    USPC .......................................................... 385/78
    See application file for complete search history.

(56) References Cited

U.S. PATENT DOCUMENTS

| 4,150,790 A | 4/1979 | Potter |
| 4,327,964 A | 8/1982 | Haesley et al. |

(Continued)

FOREIGN PATENT DOCUMENTS

| CA | 2495693 A1 | 4/2004 |
| CN | 2836038 Y | 11/2006 |

(Continued)

OTHER PUBLICATIONS

European Search Report and Written Opinion, dated Mar. 3, 2015 for EP 14187661.

(Continued)

*Primary Examiner* — Jerry M Blevins

(57) ABSTRACT

An optical fiber connector assembly comprises at least one connector having a latching arm for coupling to an adapter, and a remote release tab having a protrusion configured to cooperate with the adapter to depress said latching arm when the remote release tab is pulled relative to the adapter. The optical fiber connector assembly may further be configured to allow reversing its polarity.

18 Claims, 28 Drawing Sheets

(56) References Cited

U.S. PATENT DOCUMENTS

| | | |
|---|---|---|
| 4,478,473 A | 10/1984 | Frear |
| 4,762,388 A | 8/1988 | Tanaka et al. |
| 4,764,129 A | 8/1988 | Jones et al. |
| 4,840,451 A | 6/1989 | Sampson et al. |
| 4,872,736 A | 10/1989 | Myers et al. |
| 4,979,792 A | 12/1990 | Weber et al. |
| 5,041,025 A | 8/1991 | Haitmanek |
| D323,143 S | 1/1992 | Ohkura et al. |
| 5,212,752 A | 5/1993 | Stephenson et al. |
| 5,265,181 A | 11/1993 | Chang |
| 5,289,554 A | 2/1994 | Cubukciyan et al. |
| 5,317,663 A | 5/1994 | Beard et al. |
| 5,335,301 A | 5/1994 | Newman et al. |
| 5,348,487 A | 9/1994 | Marazzi et al. |
| 5,444,806 A | 8/1995 | deMarchi et al. |
| 5,481,634 A | 1/1996 | Anderson et al. |
| 5,506,922 A | 4/1996 | Grois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,684,903 A | 11/1997 | Kyomasu et al. |
| 5,687,268 A | 11/1997 | Stephenson et al. |
| 5,781,681 A | 7/1998 | Manning |
| 5,845,036 A | 12/1998 | De Marchi |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,134,370 A | 10/2000 | Childers et al. |
| 6,178,283 B1 | 1/2001 | Weigel |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,276,840 B1 | 8/2001 | Weiss et al. |
| 6,364,537 B1 | 4/2002 | Maynard |
| 6,371,657 B1 | 4/2002 | Chen et al. |
| 6,386,768 B1 | 5/2002 | Yoon et al. |
| 6,447,170 B1 | 9/2002 | Takahashi et al. |
| 6,461,054 B1 | 10/2002 | Iwase |
| 6,471,412 B1 | 10/2002 | Belenkiy et al. |
| 6,478,472 B1 | 11/2002 | Anderson et al. |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | McDonald et al. |
| 6,668,113 B2 | 12/2003 | Togami et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,854,894 B1 | 2/2005 | Yunker et al. |
| 6,872,039 B2 | 3/2005 | Baus et al. |
| 6,935,789 B2 | 8/2005 | Gross, III et al. |
| 7,052,186 B1 | 5/2006 | Bates |
| 7,091,421 B2 | 5/2006 | Kukita et al. |
| 7,090,406 B2 | 8/2006 | Melton et al. |
| 7,090,407 B2 | 8/2006 | Melton et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,281,859 B2 | 10/2007 | Mudd et al. |
| 7,297,013 B2 | 11/2007 | Caveney et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmel et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,473,124 B1 | 1/2009 | Briant et al. |
| 7,507,103 B1 | 3/2009 | Phillips et al. |
| 7,510,335 B1 | 3/2009 | Su et al. |
| 7,513,695 B1 | 4/2009 | Lin et al. |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,651,361 B2 | 1/2010 | Henry et al. |
| 7,695,199 B2 | 4/2010 | Teo et al. |
| 7,699,533 B2 | 4/2010 | Milette |
| 7,824,113 B2 | 11/2010 | Wong et al. |
| 7,837,395 B2 | 11/2010 | Lin et al. |
| D641,708 S | 7/2011 | Yamauchi |
| 8,083,450 B1 | 12/2011 | Smith et al. |
| 8,186,890 B2 | 5/2012 | Lu |
| 8,192,091 B2 | 6/2012 | Hsu et al. |
| 8,202,009 B2 | 6/2012 | Lin et al. |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,556,645 B2 | 10/2013 | Crain |
| 8,636,424 B2 | 1/2014 | Kuffel et al. |
| 8,641,293 B2 | 2/2014 | Lin |
| 8,651,749 B2 | 2/2014 | Dainese Junior et al. |
| 8,770,863 B2 | 7/2014 | Cooke et al. |
| 8,998,505 B2 | 4/2015 | Motofuji |
| 9,028,270 B1 | 5/2015 | Vanderwoud |
| 9,411,110 B2 | 8/2016 | Barnette et al. |
| 9,494,744 B2 | 11/2016 | de Jong |
| 9,548,557 B2 | 1/2017 | Liu |
| 9,551,842 B2 | 1/2017 | Theuerkorn |
| 9,568,686 B2 | 2/2017 | Fewkes et al. |
| 9,568,689 B2 | 2/2017 | Nguyen et al. |
| 9,581,768 B1 | 2/2017 | Baca et al. |
| 9,684,313 B2 | 6/2017 | Cline et al. |
| 9,709,753 B1 | 7/2017 | Chang et al. |
| 10,185,099 B2 | 1/2019 | Chang et al. |
| 10,444,444 B2 | 10/2019 | Ma et al. |
| 11,385,415 B2 | 7/2022 | Nguyen et al. |
| 2001/0026661 A1 | 10/2001 | de Jong et al. |
| 2002/0172467 A1 | 11/2002 | Anderson et al. |
| 2003/0053787 A1 | 3/2003 | Lee |
| 2003/0063862 A1 | 4/2003 | Fillion et al. |
| 2003/0157825 A1 | 8/2003 | Kane |
| 2004/0052473 A1 | 3/2004 | Seo et al. |
| 2004/0062487 A1 | 4/2004 | Mickievicz |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2005/0013753 A1 | 1/2005 | Eaton et al. |
| 2005/0111796 A1 | 5/2005 | Matasek et al. |
| 2005/0135752 A1* | 6/2005 | Kiani .................. G02B 6/3895 385/55 |
| 2005/0141817 A1 | 6/2005 | Yazaki et al. |
| 2006/0089049 A1 | 4/2006 | Sedor |
| 2006/0127025 A1 | 6/2006 | Haberman |
| 2006/0140453 A1 | 6/2006 | Abendschein et al. |
| 2006/0160429 A1 | 7/2006 | Dawiedczyk et al. |
| 2006/0269194 A1 | 11/2006 | Luther et al. |
| 2006/0274411 A1 | 12/2006 | Yamauchi |
| 2007/0028409 A1 | 2/2007 | Yamada |
| 2007/0079854 A1 | 4/2007 | You |
| 2007/0098329 A1 | 5/2007 | Shimoji et al. |
| 2007/0149062 A1 | 6/2007 | Long et al. |

(56) References Cited

U.S. PATENT DOCUMENTS

| | | |
|---|---|---|
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | Lin et al. |
| 2009/0022457 A1 | 1/2009 | De Jong et al. |
| 2009/0028507 A1 | 1/2009 | Jones et al. |
| 2009/0092360 A1 | 4/2009 | Lin et al. |
| 2009/0196555 A1 | 8/2009 | Lin et al. |
| 2009/0214162 A1 | 8/2009 | O'Riorden et al. |
| 2009/0220197 A1 | 9/2009 | Gniadek |
| 2009/0232455 A1 | 9/2009 | Nhep |
| 2009/0290938 A1 | 11/2009 | Lin et al. |
| 2010/0034502 A1 | 2/2010 | Lu et al. |
| 2010/0239220 A1 | 9/2010 | Lin et al. |
| 2010/0247041 A1 | 9/2010 | Szilagyi |
| 2010/0322561 A1 | 12/2010 | Lin et al. |
| 2011/0044588 A1 | 2/2011 | Larson et al. |
| 2011/0045683 A1 | 2/2011 | Foung |
| 2011/0058773 A1 | 3/2011 | Peterhans et al. |
| 2011/0091159 A1 | 4/2011 | de Jong et al. |
| 2011/0131801 A1 | 6/2011 | Nelson et al. |
| 2011/0177710 A1 | 7/2011 | Tobey |
| 2011/0267742 A1 | 11/2011 | Togami et al. |
| 2012/0099822 A1 | 4/2012 | Kuffel et al. |
| 2012/0155810 A1 | 6/2012 | Nakagawa |
| 2012/0189260 A1 | 7/2012 | Kowalczyk et al. |
| 2012/0237177 A1 | 9/2012 | Minota |
| 2012/0269485 A1 | 10/2012 | Haley et al. |
| 2012/0301080 A1 | 11/2012 | Gniadek |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121653 A1 | 5/2013 | Shitama et al. |
| 2013/0183012 A1 | 7/2013 | Cabanne Lopez et al. |
| 2013/0216188 A1 | 8/2013 | Lin et al. |
| 2013/0259429 A1 | 10/2013 | Czosnowski et al. |
| 2013/0322825 A1 | 12/2013 | Cooke et al. |
| 2014/0016901 A1 | 1/2014 | Lambourn et al. |
| 2014/0023322 A1 | 1/2014 | Gniadek et al. |
| 2014/0050446 A1 | 2/2014 | Chang |
| 2014/0133808 A1 | 5/2014 | Hill et al. |
| 2014/0219621 A1 | 8/2014 | Barnette et al. |
| 2014/0226946 A1 | 8/2014 | Cook et al. |
| 2014/0241678 A1 | 8/2014 | Brinquier et al. |
| 2014/0241688 A1 | 8/2014 | Isenhour et al. |
| 2014/0334780 A1 | 11/2014 | Nguyen et al. |
| 2014/0348477 A1 | 11/2014 | Chang |
| 2015/0111417 A1 | 4/2015 | Vanderwoud |
| 2015/0301294 A1 | 10/2015 | Chang |
| 2015/0355417 A1 | 10/2015 | Takano |
| 2015/0331201 A1 | 11/2015 | Takano et al. |
| 2015/0378113 A1 | 12/2015 | Good et al. |
| 2016/0116685 A1 | 4/2016 | Wong et al. |
| 2016/0172852 A1 | 6/2016 | Takano |
| 2016/0291262 A1 | 6/2016 | Chang |
| 2016/0195682 A1 | 7/2016 | Takano |
| 2016/0231512 A1 | 8/2016 | Seki |
| 2016/0259135 A1 | 9/2016 | Gniadek et al. |
| 2016/0266326 A1 | 9/2016 | Gniadek |
| 2016/0320572 A1 | 11/2016 | Gniadek |
| 2016/0131849 A1 | 12/2016 | Takano |
| 2016/0349458 A1 | 12/2016 | Murray et al. |
| 2017/0003458 A1 | 1/2017 | Gniadek |
| 2017/0205590 A1 | 7/2017 | Bailey et al. |

FOREIGN PATENT DOCUMENTS

| | | |
|---|---|---|
| CN | 201383588 Y | 1/2010 |
| CN | 202600189 U | 12/2012 |
| DE | 202006011910 U1 | 4/2007 |
| DE | 102006019335 A1 | 10/2007 |
| EP | 1074868 A1 | 7/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009229545 A | 10/2009 |
| JP | 2009276493 A | 11/2009 |
| TW | 200821653 A | 5/2008 |
| WO | 2001/79904 A2 | 10/2001 |
| WO | 2004/027485 A1 | 4/2004 |
| WO | 2008/112986 A1 | 9/2008 |
| WO | 2009/135787 A1 | 11/2009 |
| WO | 2010/024851 A2 | 3/2010 |
| WO | 2012/136702 A1 | 10/2012 |
| WO | 2012/162385 A1 | 11/2012 |
| WO | 2014/028527 A1 | 2/2014 |
| WO | 2014/182351 A1 | 11/2014 |
| WO | 2015/191024 A1 | 12/2015 |
| WO | 2016/148741 A1 | 9/2016 |
| WO | 2017/127208 A1 | 7/2017 |

OTHER PUBLICATIONS

European Search Report and Written Opinion, dated Feb. 19, 2015 for EP 14168005.
"Fiber Optic Connectors and Assemblies Catalog" 2009, Huber & Suhner Fiver Optics, Herisau, Switzerland, www.hubersuhner.com.
"Fiber Optic Interconnect Solutions, Tactical Fiber Optical Connectors, Cables and Termini" 2006, Glenair, Inc., Glendale, California, www.mps-electronics.de.
"Fiber Optic Products Catalog" Nov. 2007, Tyco Electronics Corporation, Harrisburg, Pennsylvania, www.ampnetconnect.com.
International Search Report and Written Opinion, dated Apr. 27, 2012 for PCT/US2011/058799.
International Search Report and Written Opinion, dated Aug. 27, 2012 for PCT/US2012/039126.
International Search Report and Written Opinion, dated Jan. 16, 2014 for PCT/US2013/54784.
International Search Report and Written Opinion, dated Oct. 9, 2014 for PCT/US2014/041500.
International Search Report and Written Opinion, dated May 14, 2014 for PCT/US2014/012137.
International Search Report and Written Opinion, dated Aug. 21, 2008 for PCT/US2008/057023.
International Preliminary Report on Patentability dated Aug. 22, 2016 from related International Application No. PCT/US2015/059458, International Filing Date Nov. 6, 2015.
International Search Report, dated May 19, 2019 for PCT/US2016/028266.
International Search Report and Written Opinion, dated Feb. 20, 2014, WO2014028527.
International Search Report and Written Opinion, dated Jan. 21, 2016, WO2015US57610.
International Preliminary Report on Patentability, Application No. PCT/US2018/015733, dated Aug. 8, 2019, 9 pages.
Non-Final Office action, U.S. Appl. No. 15/882,343, dated Nov. 19, 2018, 12 pages.
International Search Report and Written Opinion for Application No. PCT/US2011/058799, dated Nov. 1, 2011.
International Search Report for Application No. PCT/US2012/039126, dated Aug. 27, 2012.
International Search Report for Application No. WO2008112986, dated Sep. 15, 2009.
International Search Report and Written Opinion for Application No. WO2012162385, dated Nov. 29, 2012.
International Search Report for Application No. WO2014028527, dated Jul. 16, 2015.
International Search Report for Application No. WO2015191024, dated Oct. 9, 2014.
International Search Report for Application No. WO2015US57610, dated Sep. 22, 2016.
International Search Report for Application No. WO2016176083, dated May 19, 2016.

(56) References Cited

OTHER PUBLICATIONS

International Search Report for Application No. WO2016148741, dated Sep. 22, 2016.
Re-Examination U.S. Appl. No. 90/014,456 of U.S. Pat. No. 10,191,230, filed Feb. 19, 2020, 191 pages.
Molex Incorporated, HBMT Motherboard Adapter, drawings, dated Oct. 31, 2005, 2 pages.

* cited by examiner

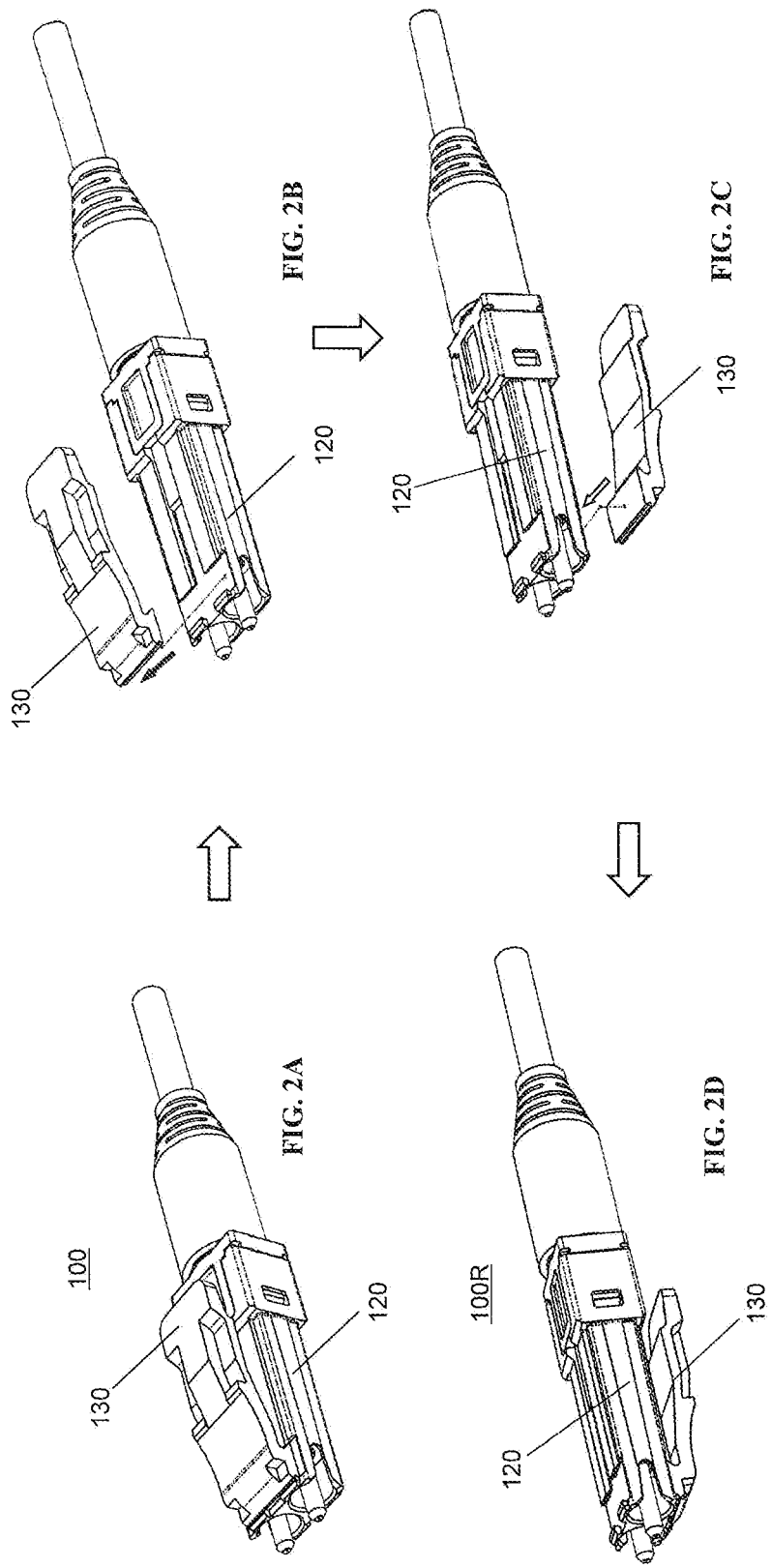

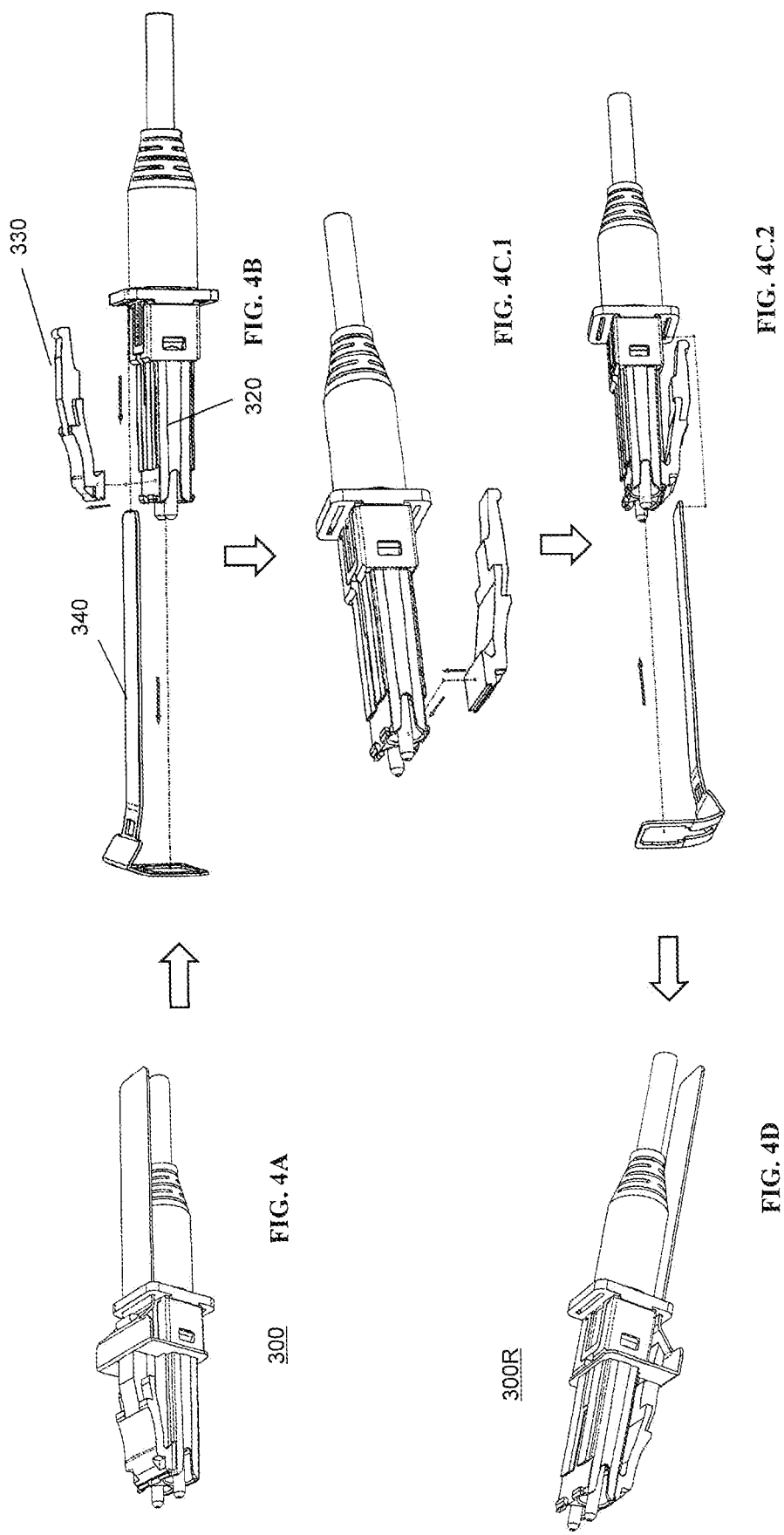

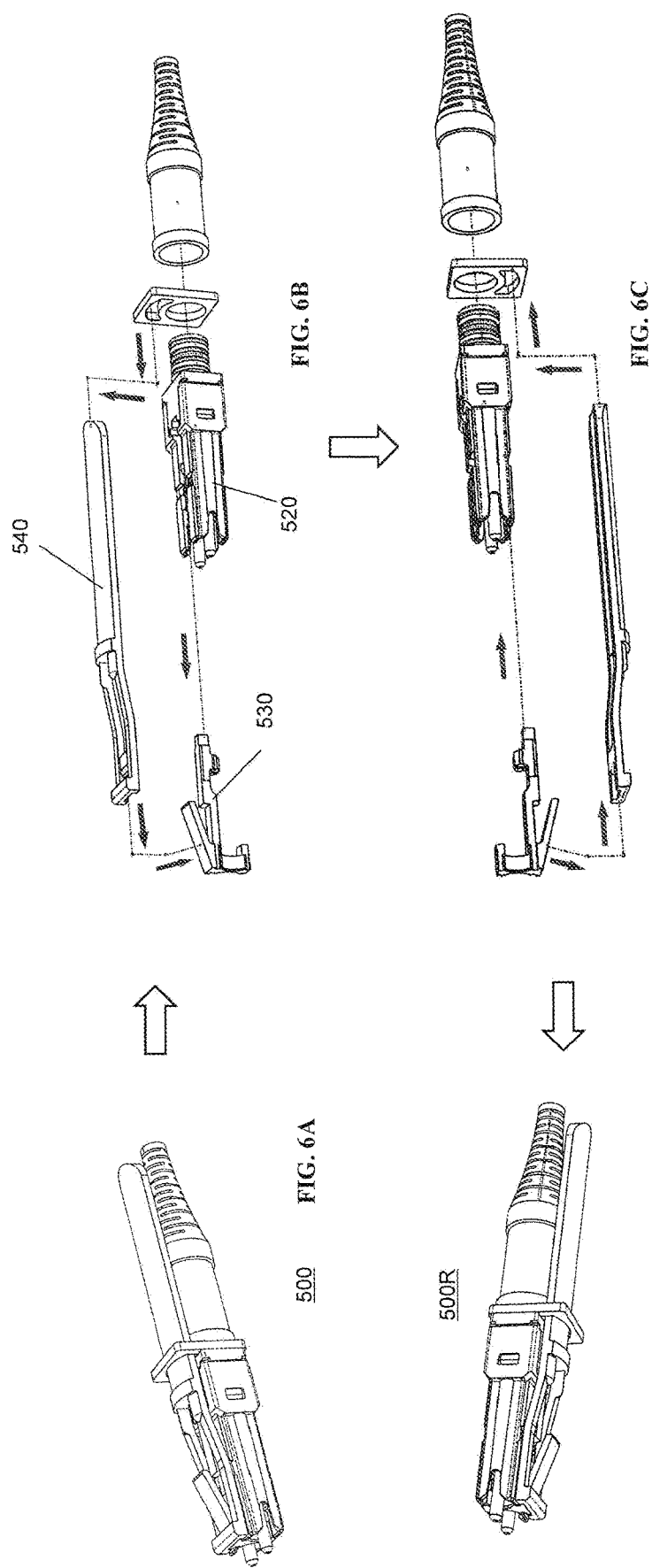

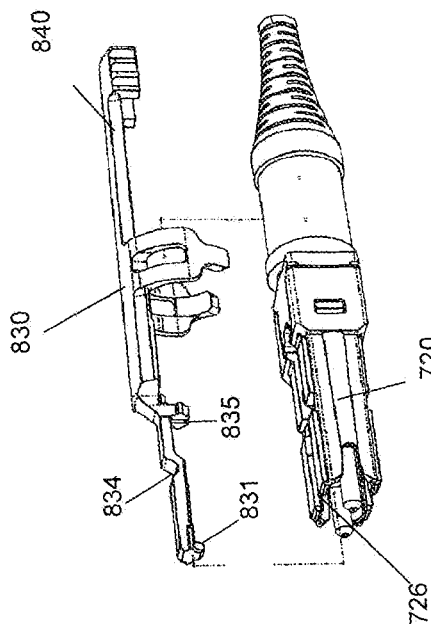
FIG. 8A.2
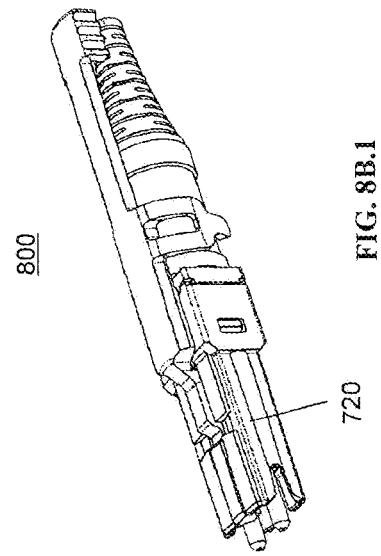
FIG. 8B.2
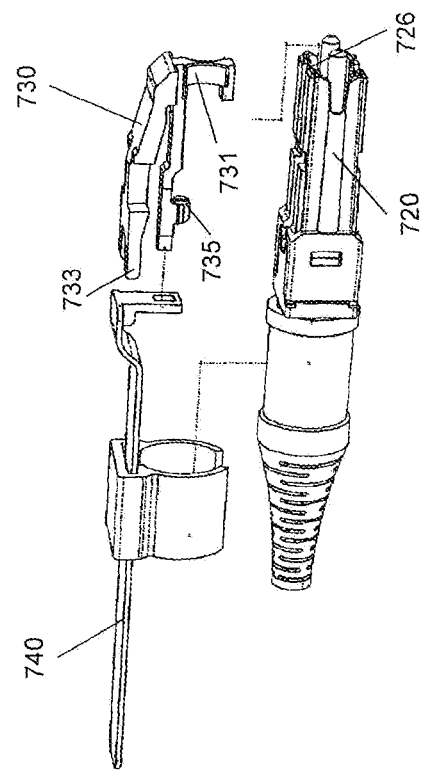
FIG. 8A.1
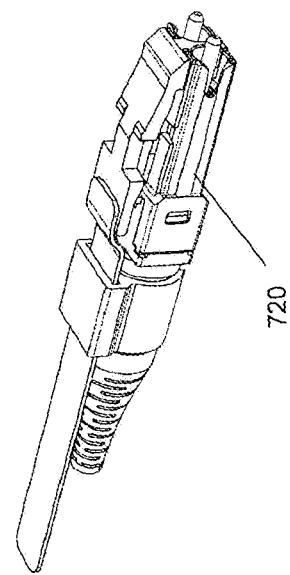
FIG. 8B.1

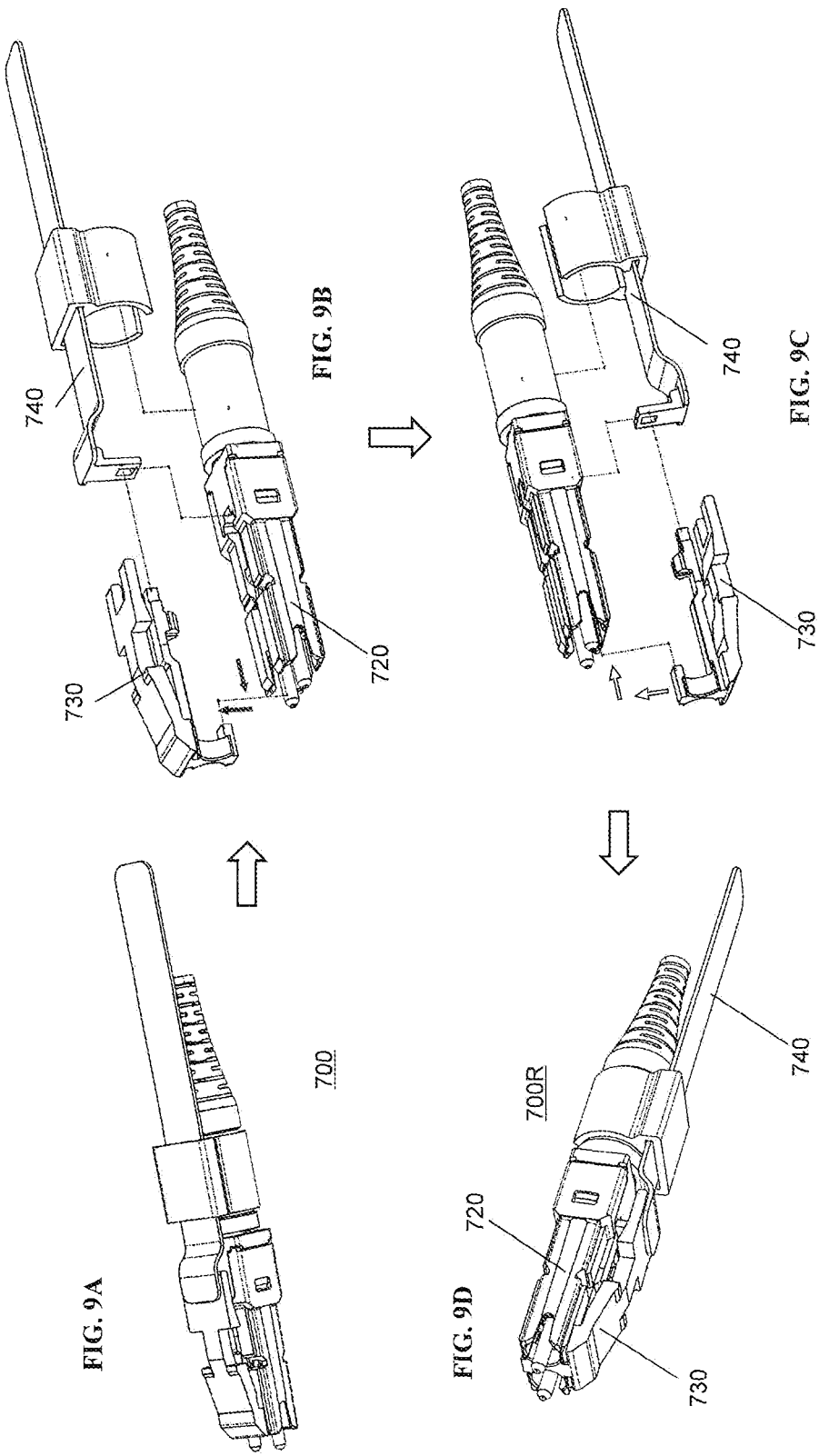

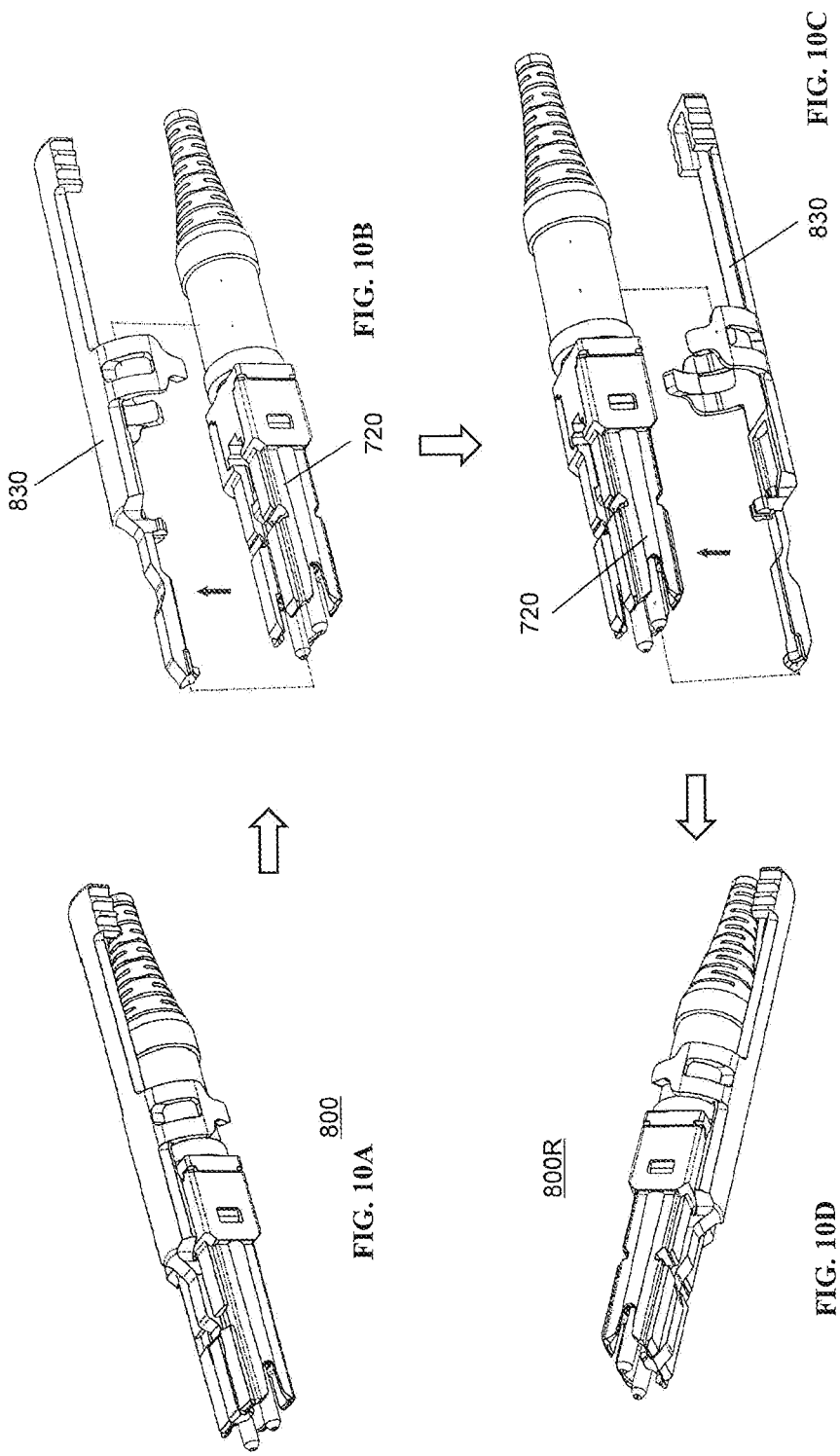

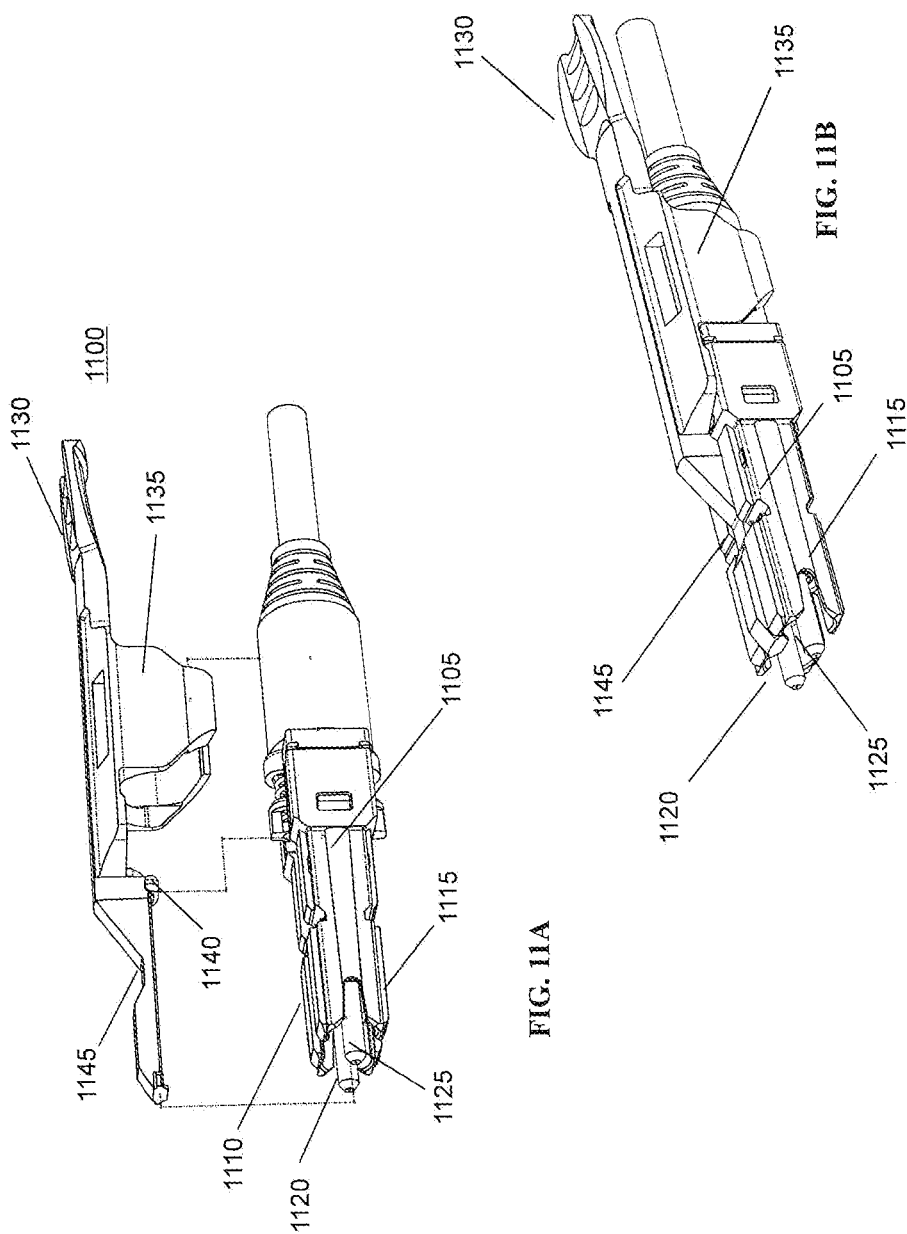

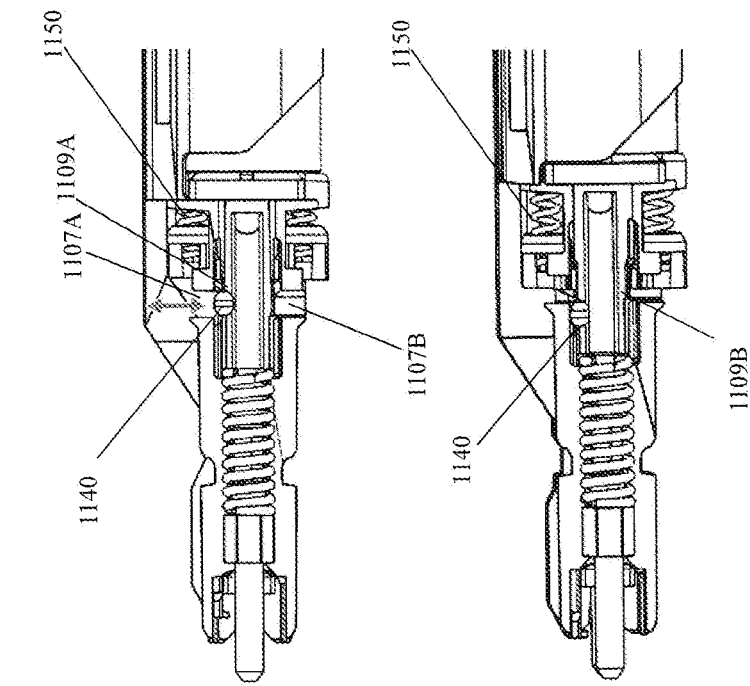
FIG. 12B
FIG. 12D
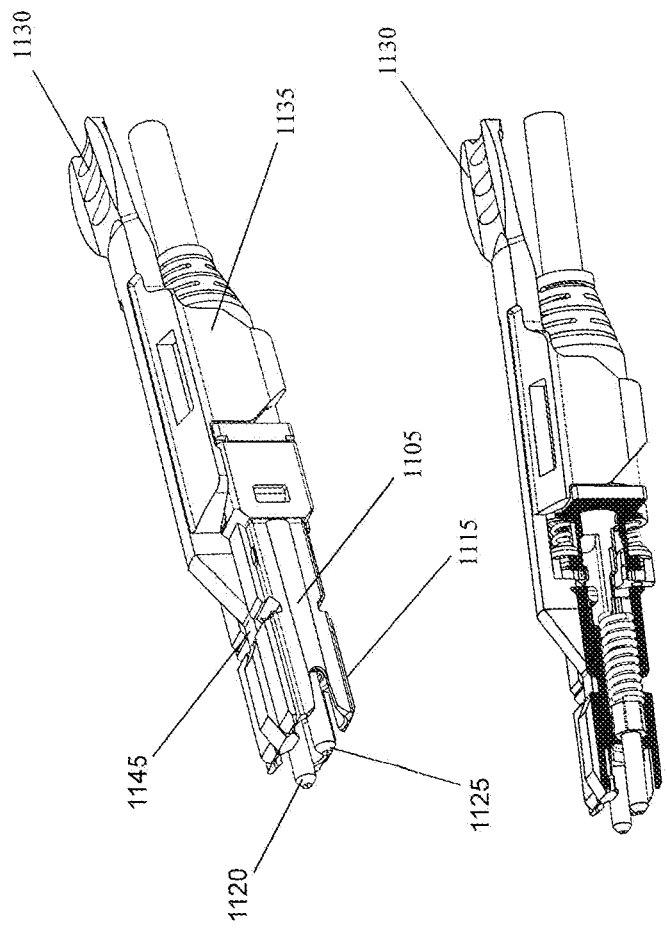
FIG. 12A
FIG. 12C

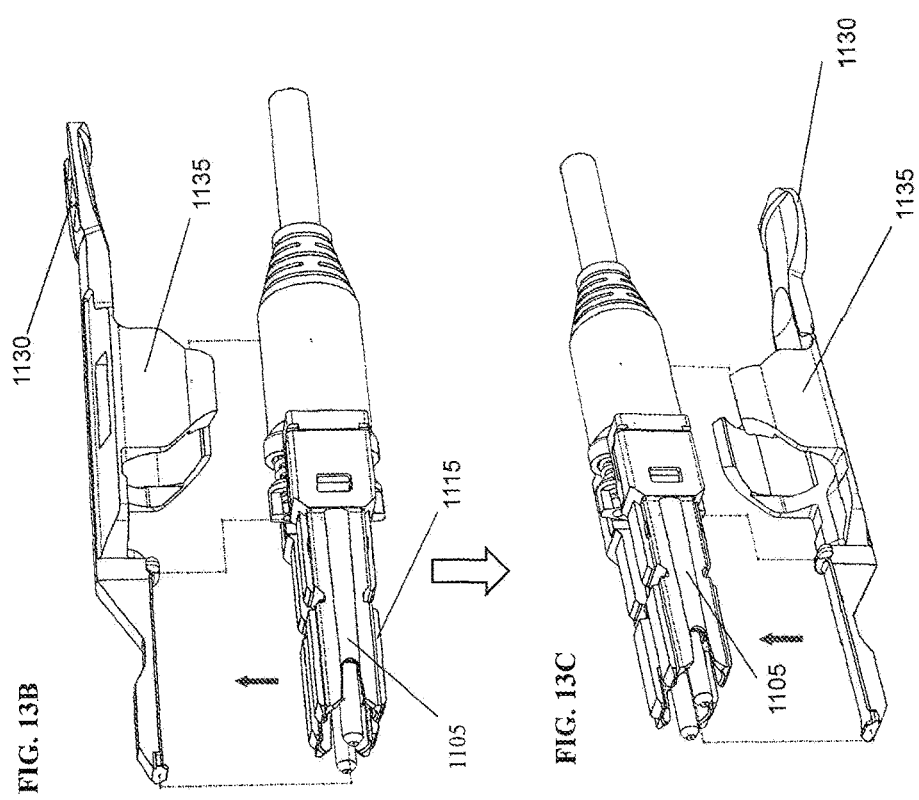
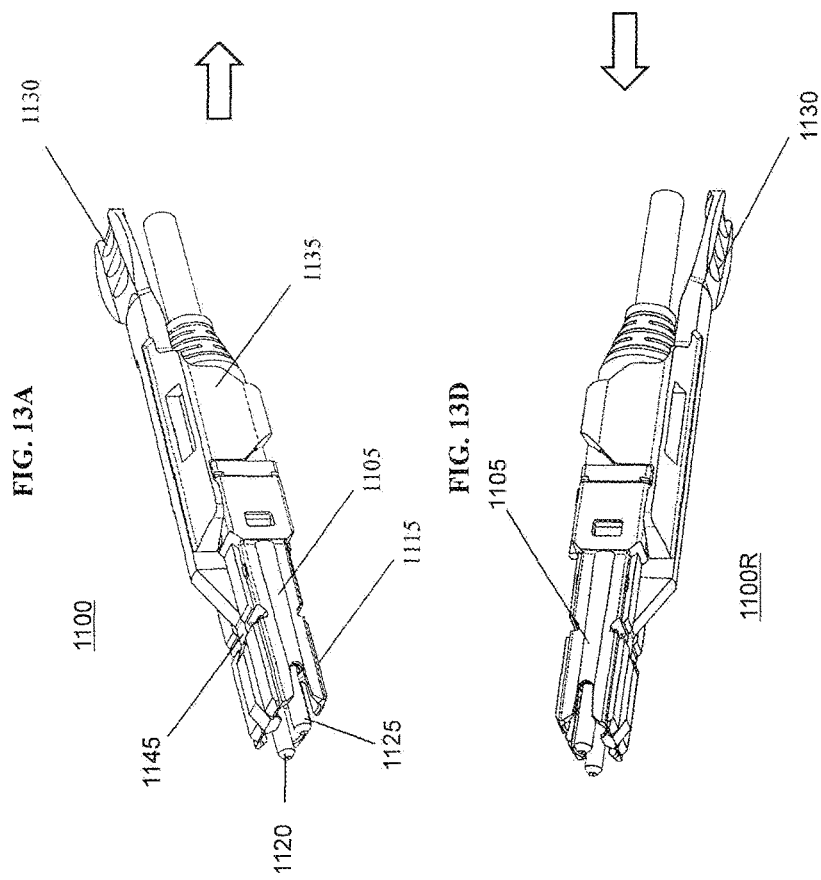

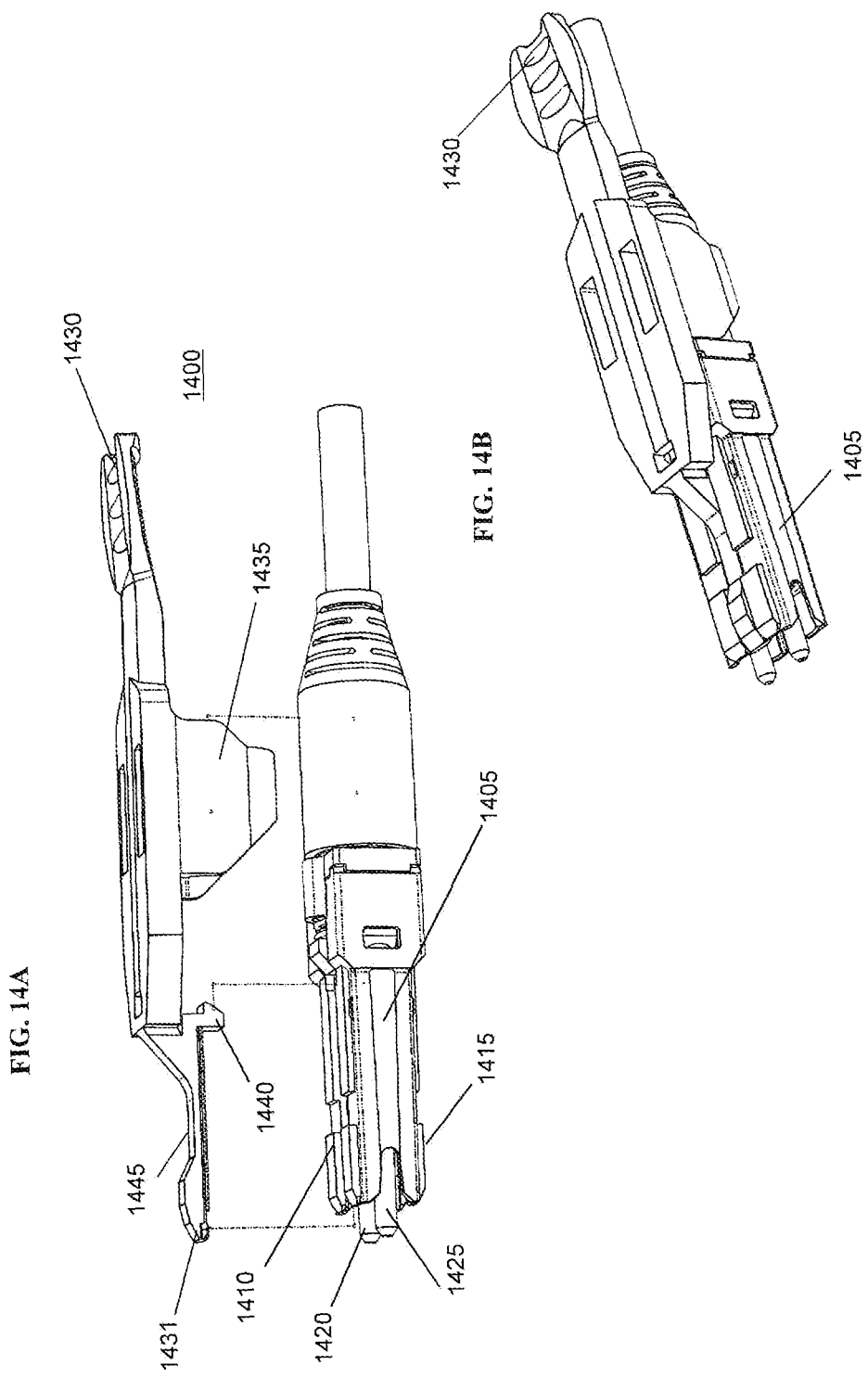

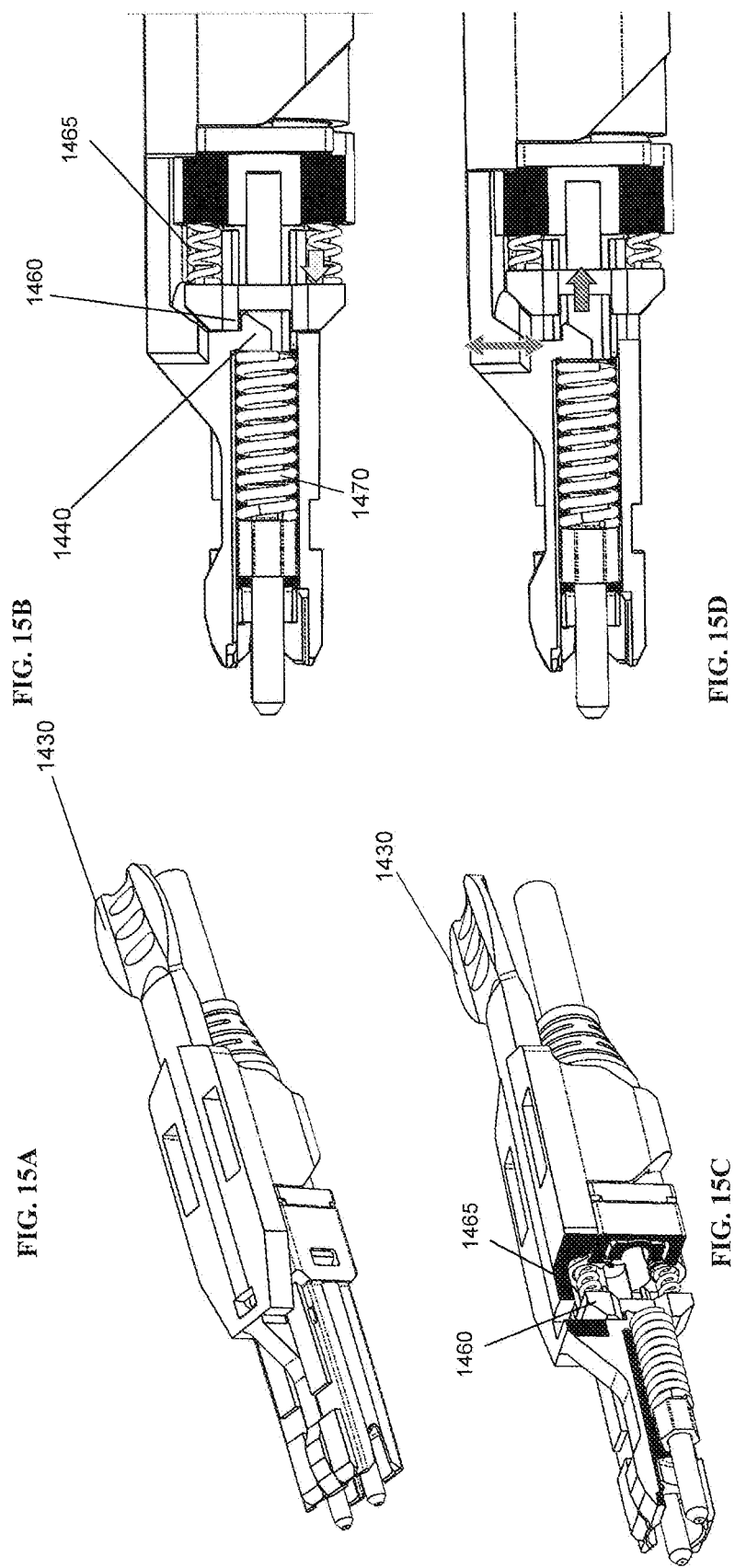

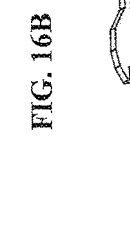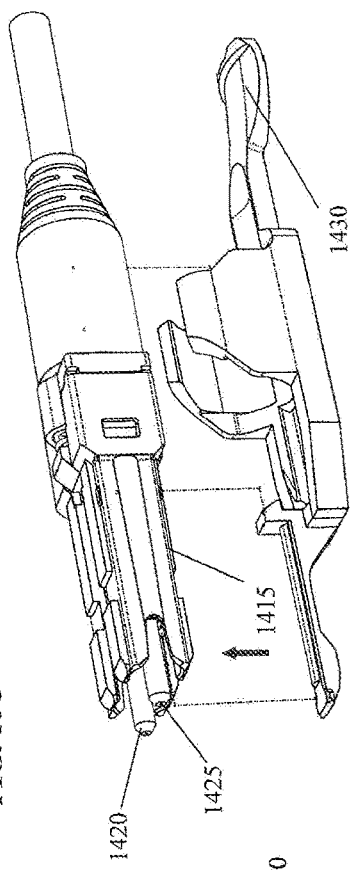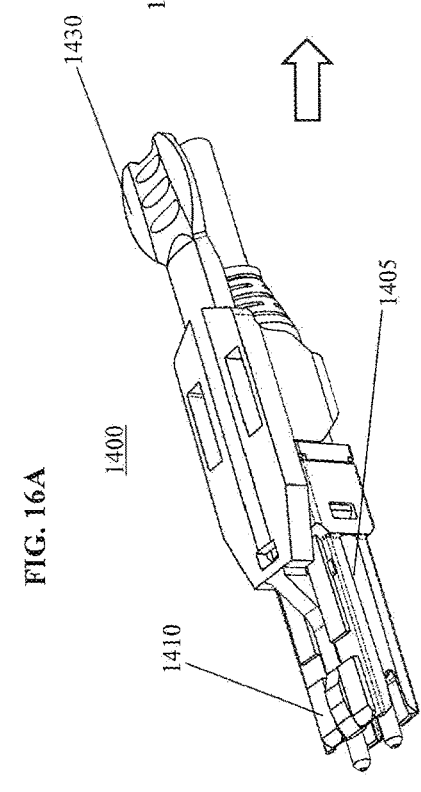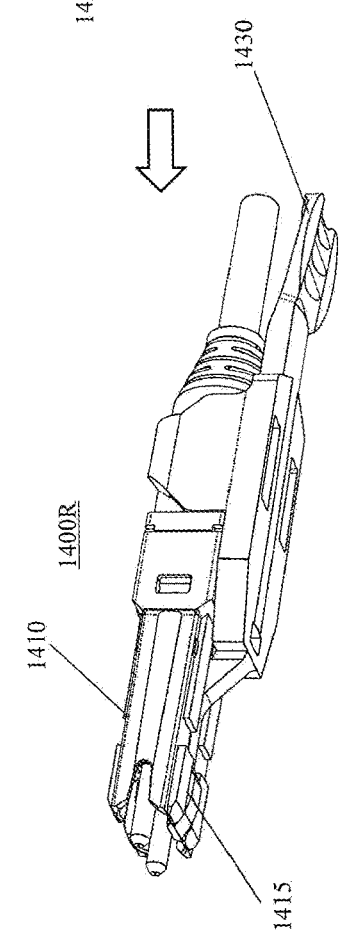
FIG. 16A
FIG. 16B
FIG. 16C
FIG. 16D

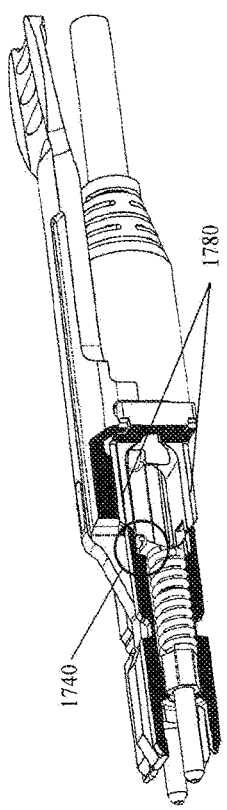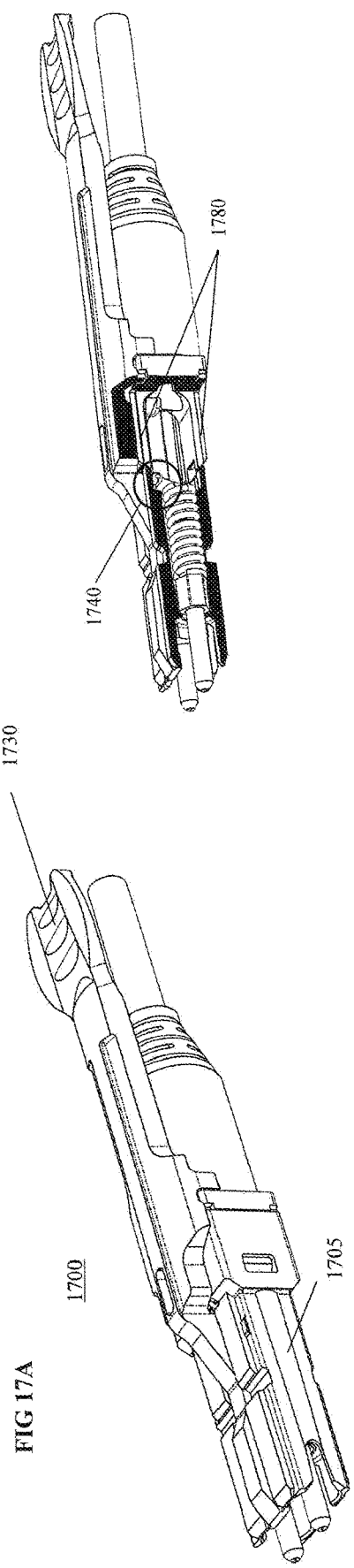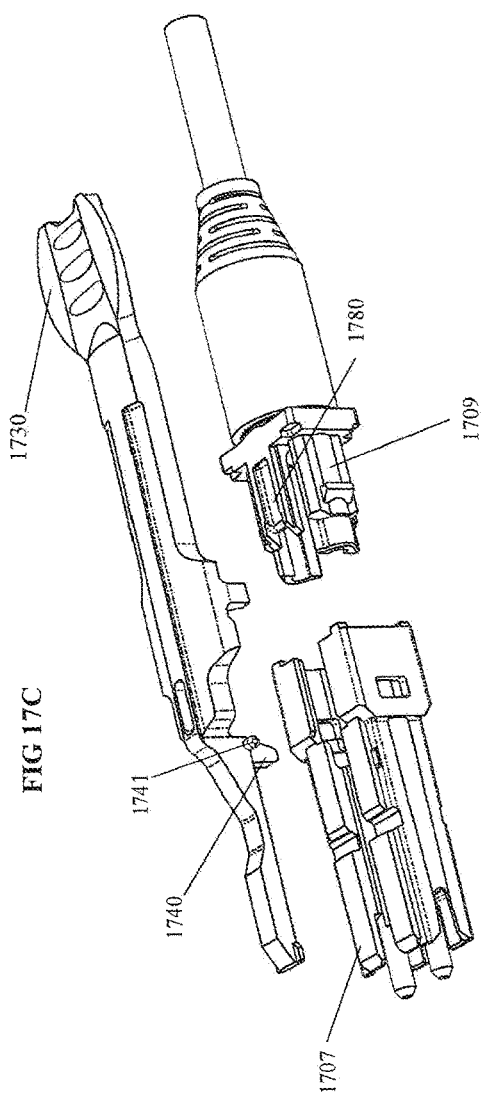

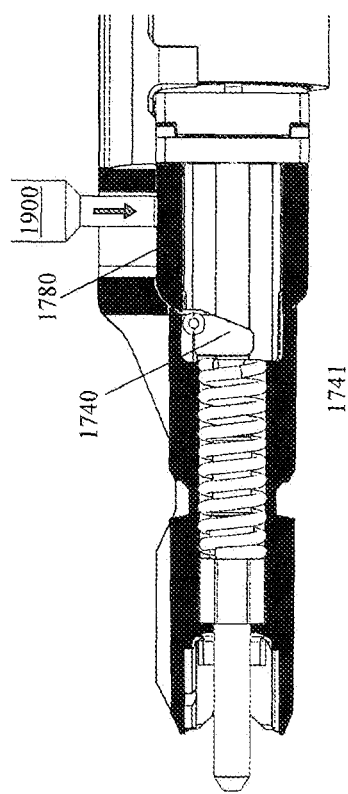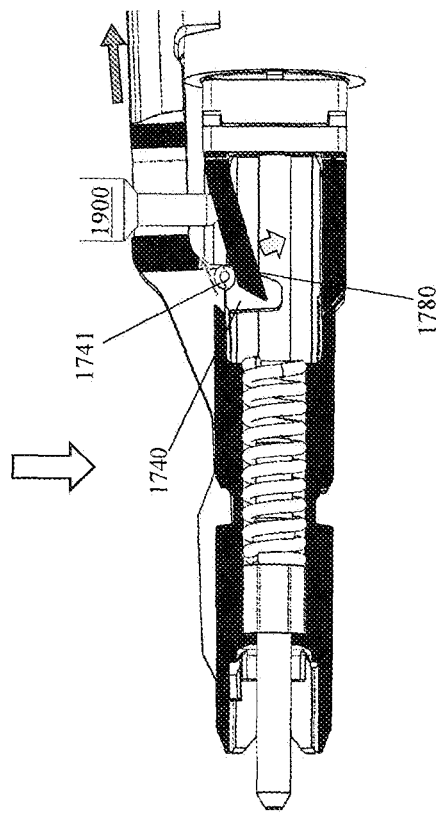

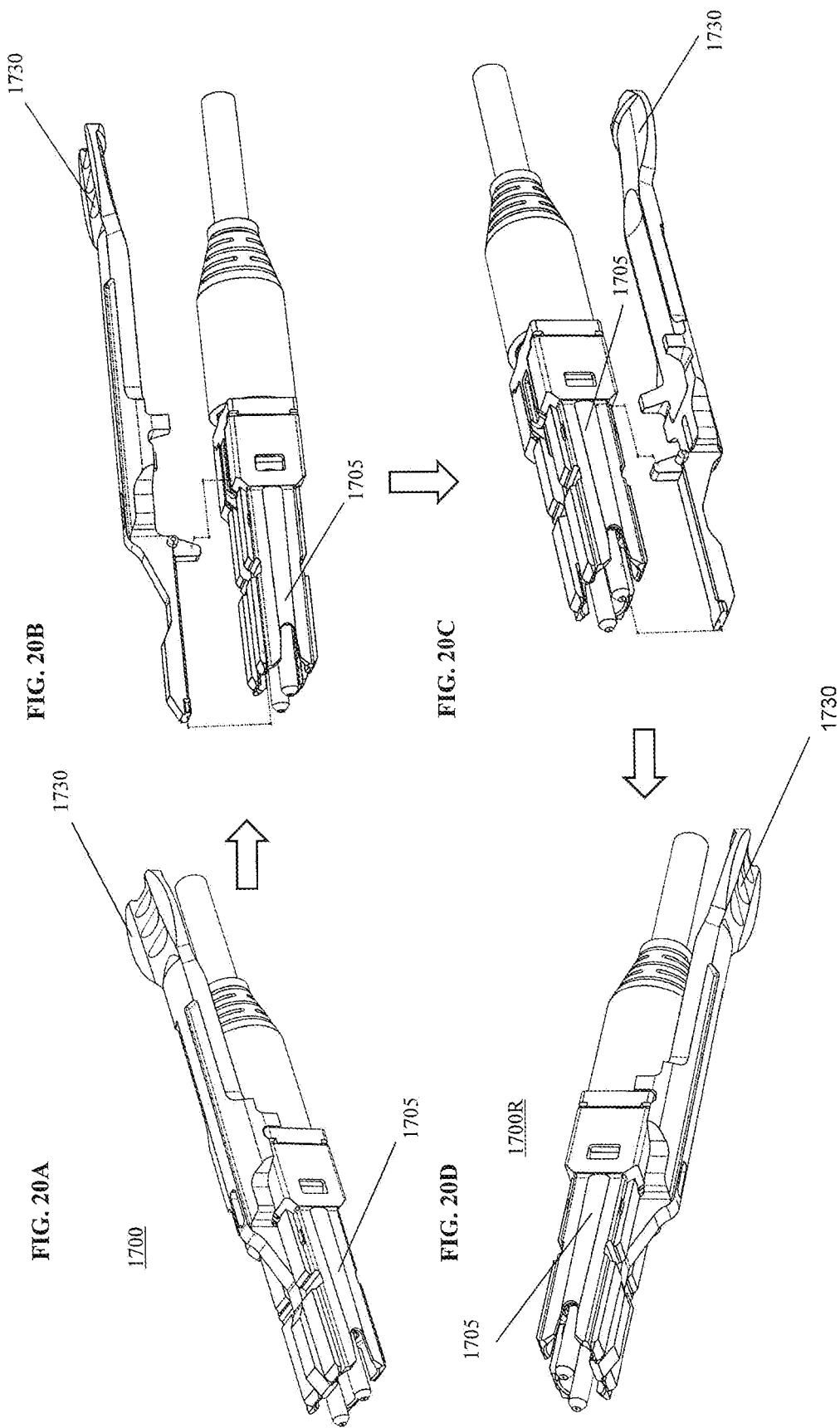

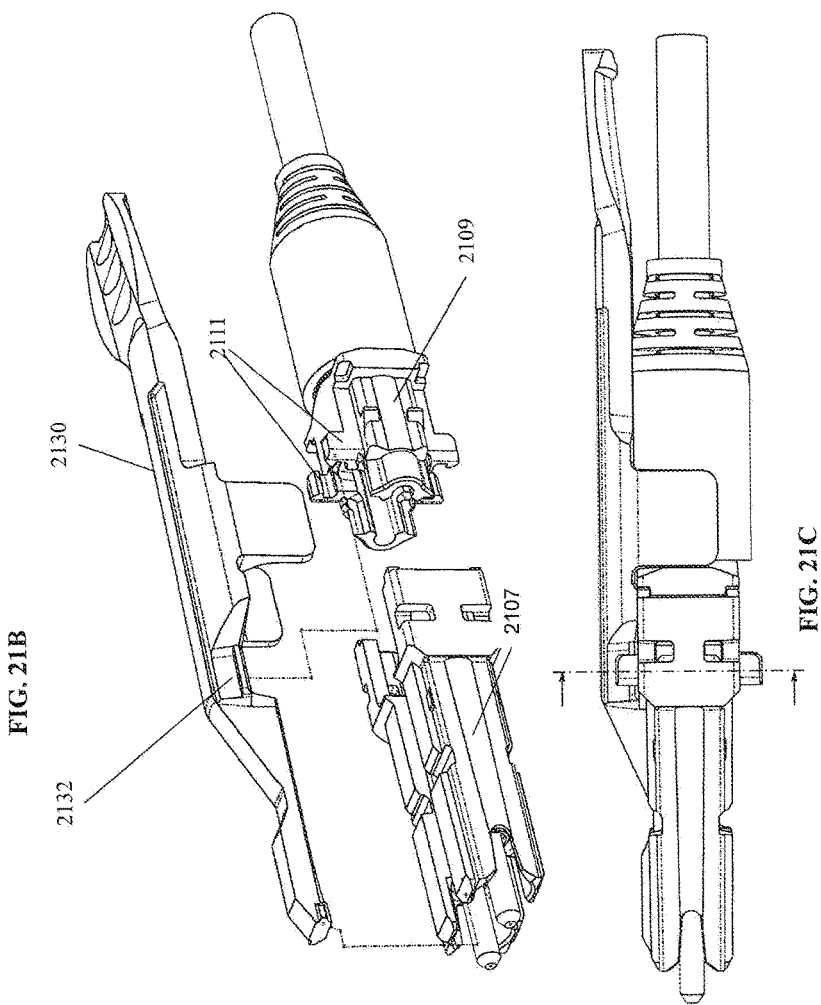
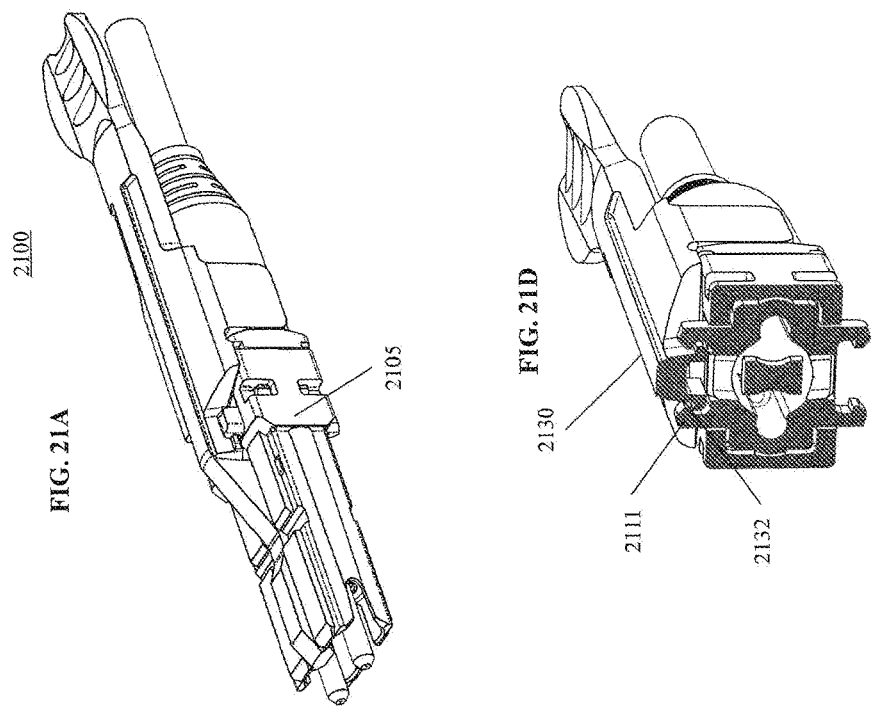

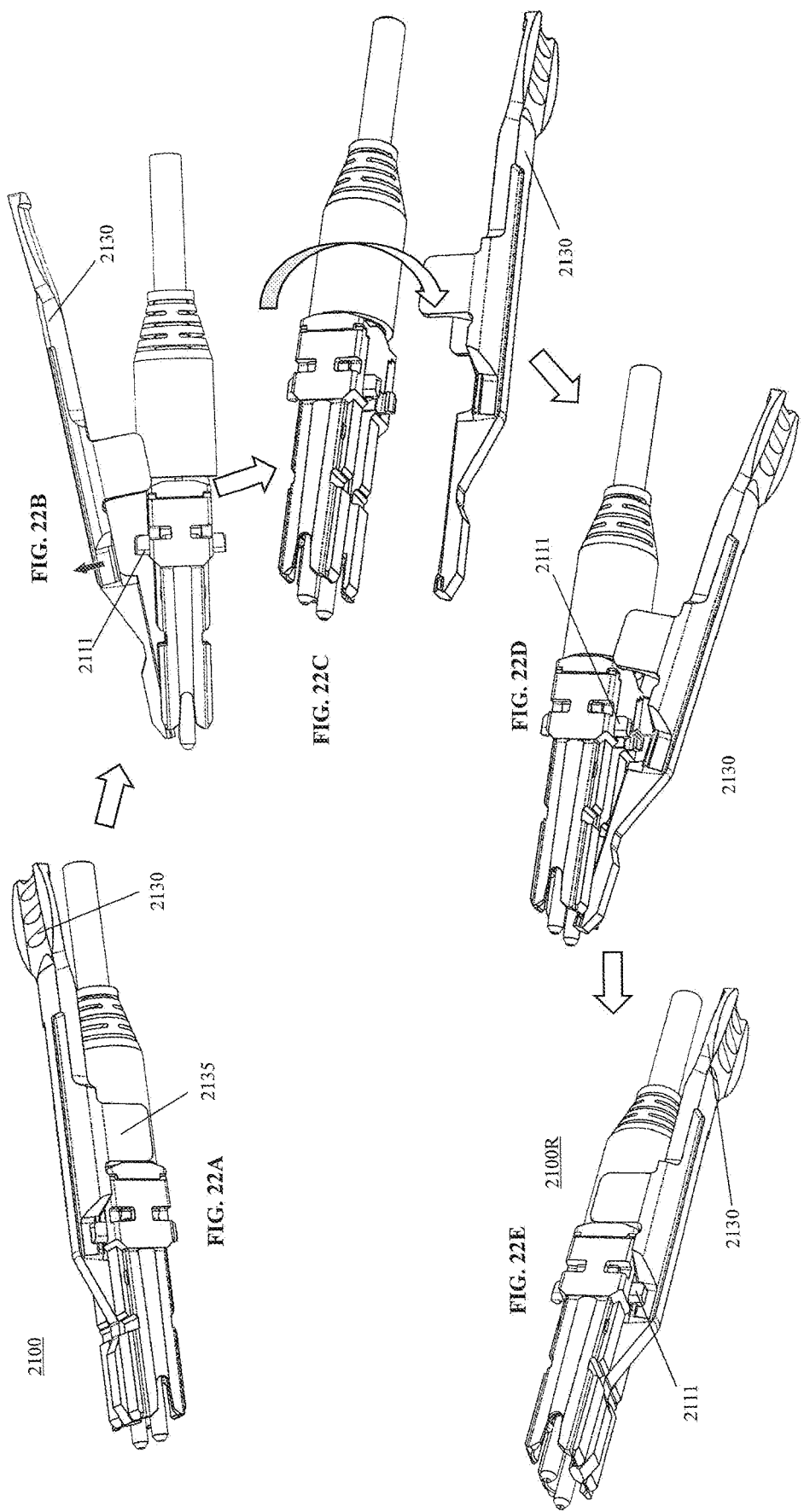

ADAPTER FOR OPTICAL CONNECTORS

CROSS-REFERENCE TO RELATED PATENT APPLICATIONS

The present application is a continuation of U.S. Non-Provisional patent application Ser. No. 17/375,856, filed on Jul. 14, 2021, titled Adapter for Optical Connectors, which is a continuation of U.S. Non-Provisional patent application Ser. No. 17/200,134, filed on Mar. 12, 2021, titled Optical Connectors with Reversible Polarity, which is a continuation of U.S. Non-Provisional patent application Ser. No. 16/297,607, filed on Mar. 9, 2019, titled Optical Connectors with Reversible Polarity and Method of Use, which claims priority to PCT Application No. PCT/US2018/016049, filed Jan. 30, 2018, which claims priority to provisional applications: 62/452,147 filed Jan. 30, 2017, No. 62/457,150 filed Feb. 9, 2017, No. 62/463,898 filed Feb. 27, 2017, No. 62/463,901 filed Feb. 27, 2017, No. 62/485,042 filed Apr. 13, 2017, No. 62/546,920, filed Aug. 17, 2017, and No. 62/581,961 filed Nov. 6, 2017; all disclosures of the above are incorporated herein by reference in their entireties.

FIELD OF THE INVENTION

The present disclosure relates generally optical connectors with reversible polarity.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connections, still exists. For example, manufacturers of connectors are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor pluggable footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

Accordingly, there is a need for smaller fiber optic connectors that will meet the needs of future developments in smaller SFPs and are reconfigurable for flexible deployment.

SUMMARY OF THE INVENTION

In a first aspect, the present disclosure provides a reversible polarity fiber optic connector including at least first and second optical ferrules and a connector housing at least partially surrounding the first and second optical ferrules. The housing has a first exterior wall positioned above the first and second optical ferrules and a second exterior wall positioned beneath the first and second optical ferrules. A latch coupling is positioned on each of the first and second exterior walls of the housing. A removable latch may engage either the first or second exterior wall latch coupling on the connector housing. Positioning the removable latch on the first exterior wall yields a fiber optic connector with a first polarity and positioning the removable latch on the second exterior wall yields a fiber optic connector with a second, opposite polarity.

In another aspect, the present disclosure provides a reversible polarity fiber optic connector with exchangeable arms for changing connector type. Thus, a common connector body may be formed into different connector types. The connector includes at least first and second optical ferrules and a common connector housing at least partially surrounding the first and second optical ferrules. The housing has a first exterior wall positioned above the first and second optical ferrules and a second exterior wall positioned beneath the first and second optical ferrules. A coupling surface is positioned on each of the first and second exterior walls of the common connector housing. To create a connector, a removable arm engages either the first or second exterior wall coupling surface; the removable arm includes either a latch or a latch recess depending upon the type of optical connector to be formed. Further, positioning the removable arm on the first exterior wall of the connector housing yields a fiber optic connector with a first polarity and positioning the removable arm on the second exterior surface of the housing yields a fiber optic connector with a second, opposite polarity.

In another aspect, the present disclosure provides a reversible polarity fiber optic connector with a push-pull tab. The connector includes at least first and second optical ferrules and has a connector housing at least partially surrounding the first and second optical ferrules. A first exterior wall is positioned above the first and second optical ferrules and a second exterior wall is positioned beneath the first and second optical ferrules. A first aperture is in the first exterior wall of the housing and a second aperture is in the second exterior wall of the housing. A removable push-pull tab includes a protrusion for positioning within either of the first or second apertures in the first and second exterior walls, respectively, of the connector housing. Positioning the removable push-pull tab with its protrusion within the first aperture yields a fiber optic connector with a first polarity and positioning the removable push-pull tab with its protrusion within the second aperture yields a fiber optic connector with a second, opposite polarity.

In yet another aspect, the present disclosure provides a reversible polarity fiber optic connector including at least first and second optical ferrules and a connector housing at least partially surrounding the first and second optical ferrules. A first exterior wall is positioned above the first and second optical ferrules and a second exterior wall is positioned beneath the first and second optical ferrules. A removable push-pull tab is provided. A first push-pull tab retainer is positioned on the first exterior wall and a second push-pull tab retainer is positioned on the second exterior wall. Positioning the removable push-pull tab in the retainer on the first exterior wall of the connector housing yields a fiber optic connector with a first polarity and positioning the removable push-pull tab in the retainer on the second exterior wall of the housing yields a fiber optic connector with a second, opposite polarity.

According to one aspect of the present disclosure, there is provided an optical fiber connector assembly comprising at least one connector, a latch arm for coupling to an adapter, and a remote release tab having a protrusion configured to cooperate with the adapter to depress said latch arm when the remote release tab is pulled relative to the adapter.

In some embodiments, the remote release tab may be coupled to the latch arm. The remote release tab may further comprise a window configured to receive the latch arm. In some embodiments, the remote release tab may be configured such that the protrusion slides along the latch arm when the remote release tab is pulled relative to the adapter. In some embodiments, the remote release tab may further be configured such that the protrusion interacts with an inner portion of the adapter to receive a downward force needed to depress said latch arm. In some embodiments, the inner portion of the adapter may be a fixed portion. In some embodiments, the protrusion may have a wedge shape. In various embodiments, the remote release tab may be configured such that the protrusion pushes down the latch arm substantially simultaneously as sliding along an inner portion of the adapter.

In some embodiments, the optical fiber connector assembly may further comprise a boot, and the remote release tab may be configured to extend over the boot.

In some embodiments, the optical fiber connector assembly may comprise a guide configured to receive the remote release tab. In various embodiments, the guide may be further configured to rotate to allow reversing a polarity of the optical fiber connector assembly.

Some embodiments of the optical fiber connector assembly may comprise a housing configured to receive the at least one connector. Some embodiments of the connector assembly may further comprise a latch arm assembly including the latch arm. The latch arm assembly may have a first portion configured to couple to the at least one connector and a second portion configured to engage the housing. In some embodiments of the connector assembly, the latch arm may be coupled to the at least one connector. In other embodiments, the at least one connector may include the latch arm as an integral structure.

BRIEF DESCRIPTION OF THE DRAWINGS

FIG. 2A is a perspective view of the reversible polarity fiber optic connector of FIG. 1A;

FIG. 2B is an exploded view of a step in the process of changing the polarity of the reversible polarity fiber optic connector of FIG. 2A;

FIG. 2C is an exploded view of a next step in the process of changing the polarity of the reversible polarity fiber optic connector of FIG. 2A;

FIG. 2D is a perspective view of the fiber optic connector of FIG. 1A with its polarity reversed;

FIG. 4A is a perspective view of the polarity of the reversible polarity fiber optic connector of FIG. 3A;

FIG. 4B is an exploded view of a step in the process of changing the polarity of the reversible polarity fiber optic connector of FIG. 4A;

FIG. 4C.1 is an exploded view of positioning the latch in the process of changing the polarity of the reversible polarity fiber optic connector of FIG. 4A;

FIG. 4C.2 is an exploded view of attaching the removed components of FIG. 4B in the process of changing the polarity of the reversible polarity fiber optic connector of FIG. 4A;

FIG. 4D is a perspective view of the reversible polarity fiber optic connector of FIG. 4A with its polarity reversed;

FIG. 6A is a perspective view of the polarity of the fiber optic connector of FIG. 5A;

FIG. 6B is an exploded view of a step in the process of changing the polarity of the reversible polarity fiber optic connector of FIG. 5A;

FIG. 6C is an exploded view of a next step in the process of changing the polarity of the reversible polarity fiber optic connector of FIG. 6A;

FIG. 6D is a perspective view of the reversible polarity fiber optic connector of FIG. 6A with its polarity reversed;

FIG. 8A.1 shows how the common connector housing of FIG. 7A is used to create a latch-type connector;

FIG. 8A.2 is an exploded view of FIG. 8A.1;

FIG. 8B.1 shows how the common connector housing of FIG. 7A is used to create a recess-type connector;

FIG. 8B.2 is an exploded view of FIG. 8B.1;

FIG. 9A is a perspective view of FIG. 8A.1 of the polarity of the latch-type fiber optic connector of FIG. 8A.1;

FIG. 9B is an exploded view of a step in the process of changing the polarity of the reversible polarity fiber optic connector of FIG. 8A.1;

FIG. 9C is an exploded view of a next step in the process of changing the polarity of the reversible polarity fiber optic connector of FIG. 8A.1;

FIG. 9D is a perspective view of the reversible polarity fiber optic connector of FIG. 8A.1 with its polarity reversed;

FIG. 10A is a perspective view of FIG. 8B.1 of the polarity of the recess-type fiber optic connector of FIG. 8B.1;

FIG. 10B is an exploded view of a step in the process of changing the polarity of the reversible polarity fiber optic connector of FIG. 8B.1;

FIG. 10C is an exploded view of a next step in the process of changing the polarity of the reversible polarity fiber optic connector of FIG. 8B.1;

FIG. 10D is a perspective view of the reversible polarity fiber optic connector of FIG. 8B.1 with its polarity reversed;

FIGS. 11A and 11B respectively depict exploded and perspective views of a reversible polarity optical connector according to a further embodiment of the disclosure;

FIGS. 12A-12D depict the operation of the reversible polarity optical connector of FIGS. 11A and 11B;

FIGS. 13A-13D depict the process for changing the polarity of the optical connector of FIGS. 11A and 11B;

FIGS. 14A and 14B respectively depict exploded and perspective views of a reversible polarity optical connector according to a further embodiment of the disclosure;

FIGS. 15A-15D depict the operation of the reversible polarity optical connector of FIGS. 14A and 14B;

FIGS. 16A-16D depict the process for changing the polarity of the optical connector of FIGS. 14A and 14B;

FIGS. 17A-17C respectively depict perspective, partial cross-section, and exploded views of a reversible polarity optical connector according to a further embodiment of the disclosure;

FIGS. 19A-19B depict the removal of the push-pull tab from the connector body using a tool;

FIGS. 20A-20D depict the process for changing the polarity of the optical connector of FIGS. 17A-17C;

FIGS. 21A-21D depict the process of changing polarity of an optical connector according to an embodiment of the invention;

FIGS. 22A-22E depict the process for changing the polarity of an optical connector according to an embodiment of the invention;

DETAILED DESCRIPTION

Figure 1B:
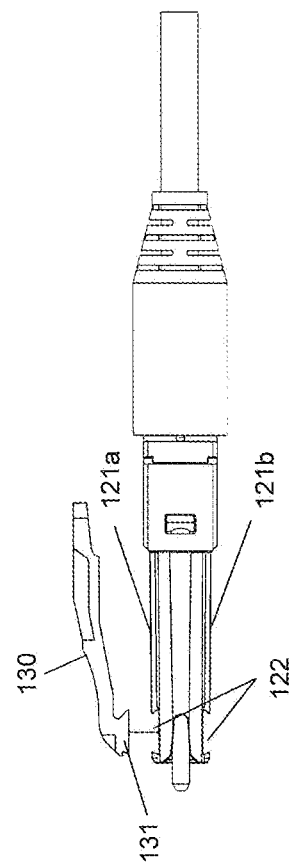
FIG. 1B is a side view of the reversible polarity fiber optic connector of FIG. 3A with the removable latch being removed from the connector housing.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

The connectors of the present disclosure may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing. In some embodiments, the housing may incorporate any or all of the components described herein.

Various embodiments described herein generally provide a remote release mechanism such that a user can remove cable assembly connectors that are closely spaced together without damaging surrounding connectors, accidentally disconnecting surrounding connectors, disrupting transmissions through surrounding connectors, and/or the like. Various embodiments also provide narrow pitch LC duplex connectors and narrow width multi-fiber connectors.

As discussed herein, current connectors may be improved by various means, such as, for example, reducing the footprint, increasing the structural strength, enabling polarity changes, etc. Various embodiments disclosed herein offer improvements over the current state of the art, as will be further discussed below.

In some embodiments, the fiber optic connector may be a narrow pitch duplex LC connector including two LC connectors. In some embodiments, such as that shown, the two LC connectors may comprise a single combined unit. In alternative embodiments, the LC connectors may be separate members, wherein an air gap exists between the two members, or wherein the two separate members are located adjacent and flush to each other (i.e., no air gap exists). In some embodiments, each of the LC connectors includes a respective ferrule and a respective extending member or modular arm. The connector may have a pitch of 4.8 mm, defined as the axis-to-axis distance between the central axes of the LC connectors. In other embodiments, the connector pitch may be less than that of the pitch of conventional connectors, for example less than 6.25 mm and less than about 5.25 mm. In some embodiments, the pitch may be about 4.8 mm or less.

In current designs, if a fiber optic connector, particularly a duplex connector, needs to have the ferrules rotated or swapped, for example, for exchanging transmit and receive optical fibers, it can be a time consuming and difficult process. Generally, if a duplex connector needs to be rotated, current systems require twisting the individual LC connector tips 180 degrees. However, this process also twists the fibers that enter the connector tip. Twisting the fiber at any stage of the connection can cause wear and/or damage to the delicate fibers. Thus, most systems involve an alternative solution, wherein the duplex connector is partially or completely disassembled in order to access the ferrules or fibers and manually relocate them within the duplex connector. However, swapping ferrules side to side is a delicate operation. In order to prevent damage to the internal fibers, great care must be taken. Thus, this operation usually requires specialized tools and preparation time to perform safely and accurately.

Therefore, embodiments as described herein, allow for easy, quick, and safe swapping of the left and right side ferrules in a connector. Thus, embodiments discussed herein allow for a change in polarity of the duplex connector without twisting the fibers or performing any complex disassembly of the duplex connector.

Figure 1A:
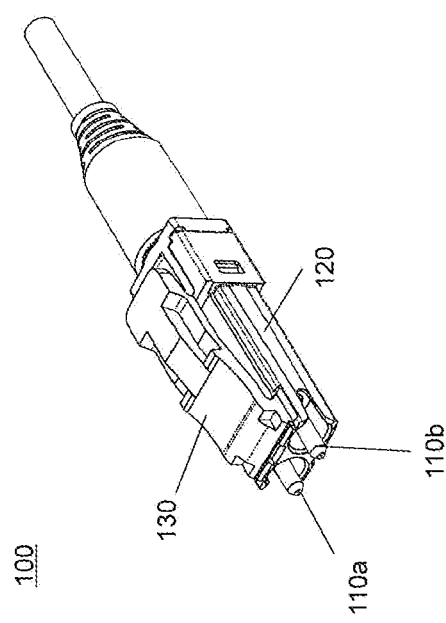
FIG. 1A is a perspective view of one embodiment of a reversible polarity fiber optic connector according to some aspects of the present disclosure.

FIGS. 1A and 1B depict a fiber optic connector with reversible polarity according to one aspect of the present disclosure. As shown in FIG. 1A, a reversible polarity fiber optic connector may include first and second optical ferrules 110a and 110b and a connector housing 120 at least partially surrounding the first and second optical ferrules. A removable latch 130 is depicted in FIG. 1A in its assembled state and in FIG. 1B removed from the connector housing 120.

FIG. 1B is a side view of the reversible polarity fiber optic connector of FIG. 1A with the removable latch 130 being separated from the connector housing. As shown, the connector housing 120 may have a first exterior wall 121a positioned above the first and second optical ferrules and a second exterior wall 121b positioned beneath the first and second optical ferrules. A latch coupling 122 is positioned on each of the first and second exterior walls of the housing. The removable latch 130 may include a protrusion 131 for engaging the housing latch coupling 122. In particular, the latch coupling 122 may include angled walls that interact with slanted edges of the protrusion 131 to prevent accidental disassembly of the latch 130. Although the latch coupling 122 is depicted as a recess on the housing accommodating a latch protrusion, these elements may be reversed with the latch including a recess and the housing including a protrusion. Other mechanical coupling mechanisms may be used to interconnect the housing and the removable latch. For example, an embodiment may involve a coupling system wherein the removable latch is inserted into a recess in the connector housing and twisted (e.g., 90°, 180°, etc.) to secure the latch to the recess. Alternative coupling may use a more complex shape. For example, a u-shaped recess in the connector housing may engage a cooperatively-shaped projection in the latch that is inserted and fed through the u-shape until secure. It should thus be understood, that any system or method of coupling may be used to attach the removable latch to the connector housing, including various locations (e.g., sliding from the front, sides, back, bottom, top, etc.).

FIGS. 2A-2D depict the process for changing the polarity of the fiber optic connector of FIG. 1A from a first polarity, FIG. 2A to a second, opposite polarity, FIG. 2D. The removable latch 130 may be removed from the latch coupling on the first exterior wall of the connector housing, FIG. 2B, positioned adjacent the second exterior wall on beneath the ferrules, FIG. 2C, and then coupled with the latch coupling on the second exterior wall of the connector housing to yield a connector 100R, FIG. 2D, having the opposite polarity of connector 100. In this manner, transmit and receive optical fibers may be reversed without necessitating any fiber twist or complex repositioning of the optical ferrules.

In typical embodiments, the latch of the connector housing is required to be flexible. Thus, when a latch and a connector housing (e.g., duplex connector) are built as one unified member (as is currently done), the fiber optic connector is built of a similar flexible or less rigid material. Building the connector housing out of a plastic or polymeric material, limits the amount of rigidity that it can have. Thus, as fiber optic connectors continue to reduce in size, the strength of the housing has been reduced. Therefore, it would be advantageous to build the connector housing out of a more robust material while still allowing the latch to remain flexible. In order to accomplish this, in some embodiments according to aspects of the present disclosure, the connector housing may be manufactured out of a very rigid or strong material (e.g., steel, graphene, carbon, metal alloys, or any material of suitable properties). Because the connector housing and the removable latch need only interlock with each other, the removable latch may still be made out of a more flexible material. Thus, the removable nature of the latch disclosed herein allow for a more robust and secure overall design when dealing with the shrinking footprint of fiber optic connectors.

Figure 3A:
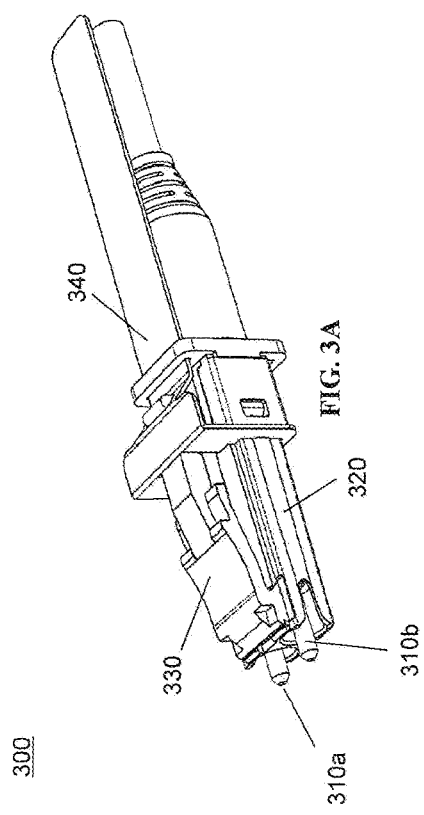
FIG. 3A is a perspective view of an embodiment of a reversible polarity fiber optic connector with a pull tab according to aspects of the present disclosure.

FIG. 3A is a perspective view of another embodiment of a reversible polarity fiber optic connector 300. As shown, the reversible polarity fiber optic connector may further comprise a pull tab 340 for engaging a removable latch 330. The pull tab 340 depresses the latch 330 as the tab is pulled in a direction away from the fiber optic ferrules.

Figure 3B:
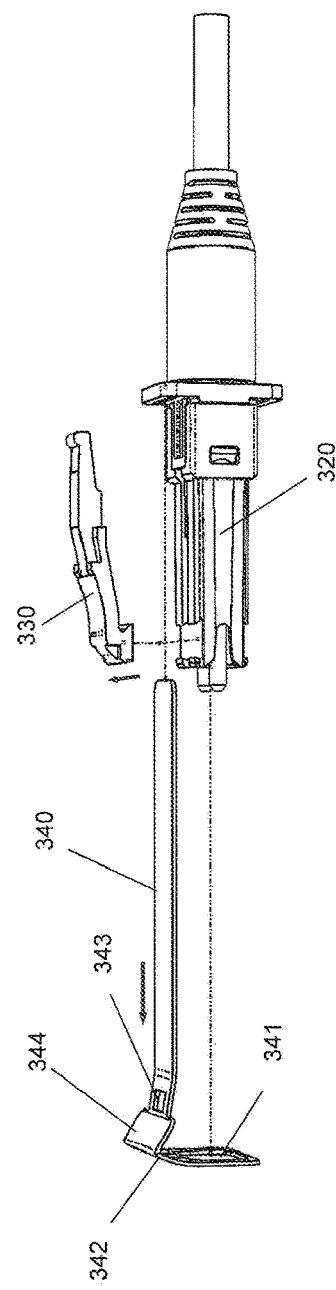
FIG. 3B is an exploded view of the reversible polarity fiber optic connector of FIG. 3A.

FIG. 3B is an exploded view of the reversible polarity fiber optic connector of FIG. 3A. As shown, the pull tab 340 may comprise a first opening 341 and a second opening 344. The first opening 341 is configured to allow the connector housing and the removable latch to pass through while the second opening is configured to accommodate the tip of the latch. The pull tab may further comprise a first deformable portion 342 and a second deformable portion 344. In operation, the first deformable portion 342 cooperates with the second deformable portion 344 to depress the removable latch when the pull tab is pulled in a direction away from the ferrules.

FIGS. 4A-4D depict the process for changing the polarity of the fiber optic connector 300 from a first polarity, FIG. 4A to a second polarity 300R, FIG. 4D. The pull tab 340 may be disengaged from the connector housing 320 and the removable latch 330 on the first exterior wall of the connector housing, FIG. 2B. The removable latch is then detached from the latch coupling on the first exterior wall of the connector housing, FIG. 4C.1. Next, the removable latch is engaged with the latch coupling on the second exterior wall of the connector housing, beneath the ferrules, FIG. 4C.2. Finally, the pull tab 340 is positioned surrounding the connector housing and engaging the removable latch tip, resulting in the assembled optical connector 300R having polarity opposite to that of connector 300, FIG. 4D.

Figure 5A:
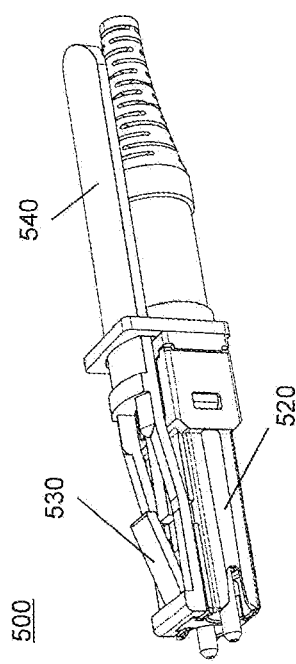
FIG. 5A is a perspective view of another embodiment of a reversible polarity fiber optic connector with a pull tab according to aspects of the present disclosure.
Figure 5B:
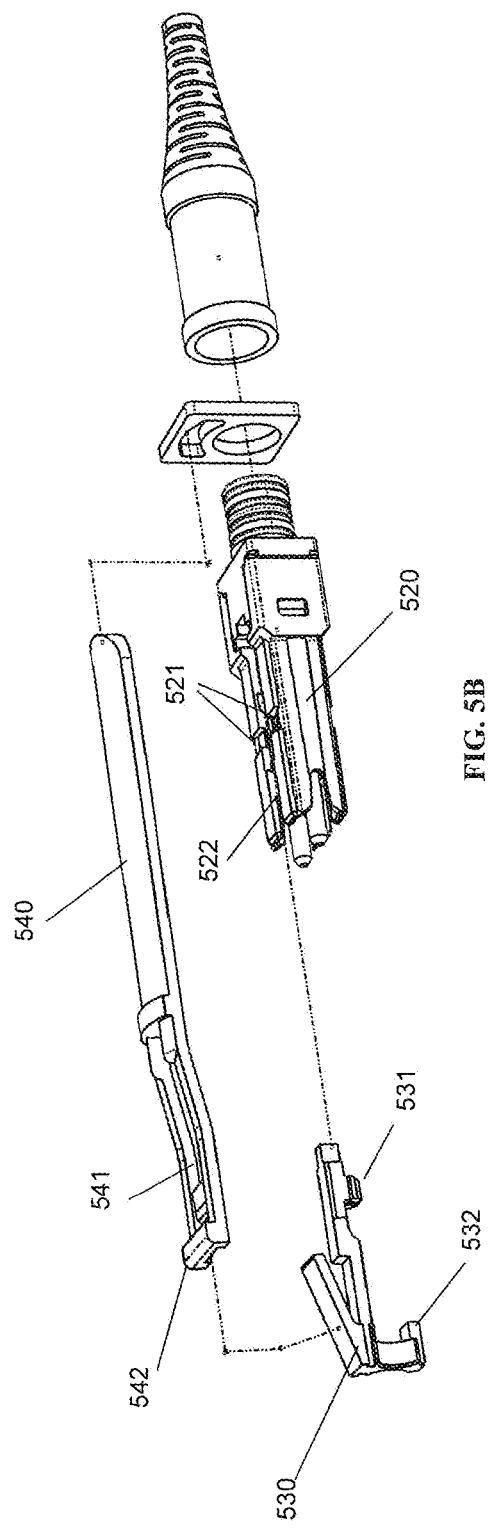
FIG. 5B is an exploded view of the reversible polarity fiber optic connector of FIG. 5A.

FIGS. 5A and 5B are a perspective view and exploded view, respectively, of another embodiment of a reversible polarity fiber optic connector 500. The connector 500 includes a connector housing 520, a latch 530, and a pull tab 540. On the first and second exterior walls of connector housing 520 are latch couplings that include a groove 522. A recess 521 is also provided in the housing. The latch 530 includes a protrusion 531 that is received within groove 522. The latch further includes a projection 532 that is received in the housing between the optical ferrules. The pull tab 540 includes an opening 541 for engaging the removable latch 530. A front protrusion 542 is configured to depress the removable latch 530 when the pull tab is pulled in a direction away from the ferrule side of the optical connector.

FIGS. 6A-6D depict the process for changing the polarity of the fiber optic connector 500 from a first polarity, FIG. 6A to a second polarity, FIG. 6D. The pull tab 540 is disengaged from the connector housing and the removable latch 530 on the first exterior wall of the connector housing, FIG. 6B, and the removable latch is decoupled from the latch coupling on the first exterior wall of the connector housing. Then the removable latch may be coupled with the latch coupling on the second exterior wall of the connector housing, beneath the optical ferrules in FIG. 6C, and the pull tab 540 is engaged with the connector housing and the removable latch on the second exterior wall of the connector housing to create reverse polarity connector 500R, FIG. 6D.

It is of interest within the optical connectivity industry to have multiple styles of optical connectors for multiple purposes and/or multiple implementation styles. Thus, in order to more easily provide flexibility, a solution is needed that allows for on-the-fly, in-the-field, or in manufacturing modification of the connector. The below embodiment provides a universal type fiber optic connector which has a unique housing design that allows for different latches or arms to be attached.

Figure 7C:
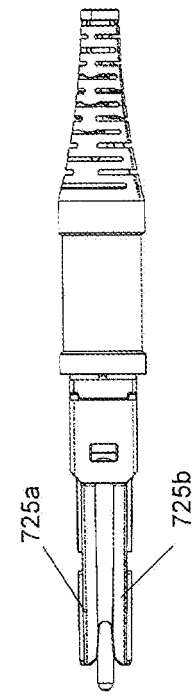
FIG. 7C is the top view of the common connector housing of FIG. 7A.
Figure 7D:
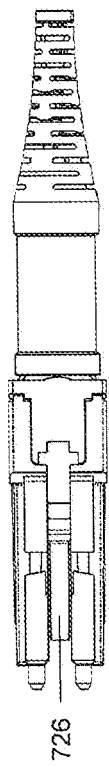
FIG. 7D is the side view of the common connector housing of FIG. 7A.
Figure 7A:
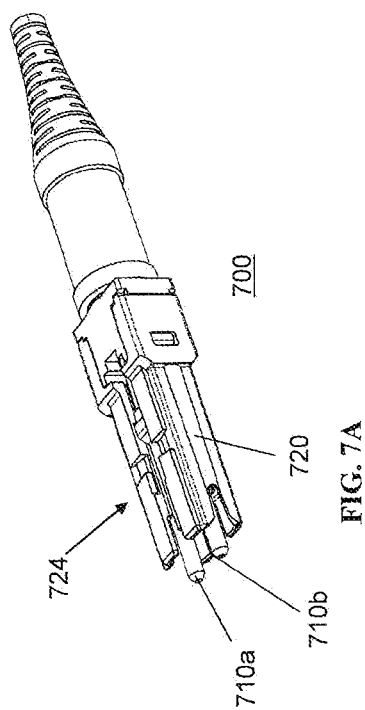
FIG. 7A is a perspective view of a common connector housing of a reversible polarity fiber optic connector with exchangeable arms for changing connector type in an embodiment according to aspects of the present disclosure.

FIG. 7A is a perspective view of a common connector housing 720 of a reversible polarity fiber optic connector 700 with exchangeable arms for changing connector type in an embodiment according to aspects of the present disclosure. As shown, the reversible polarity fiber optic connector may comprise first and second optical ferrules 710a and 710b and the common connector housing 720 at least partially surrounding the first and second optical ferrules.

Figure 7B:
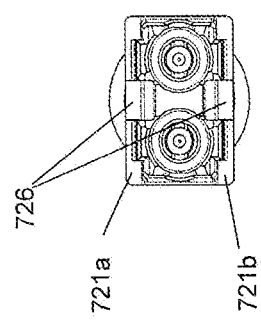
FIG. 7B is the front view of the common connector housing of FIG. 7A.
Figure 18B:
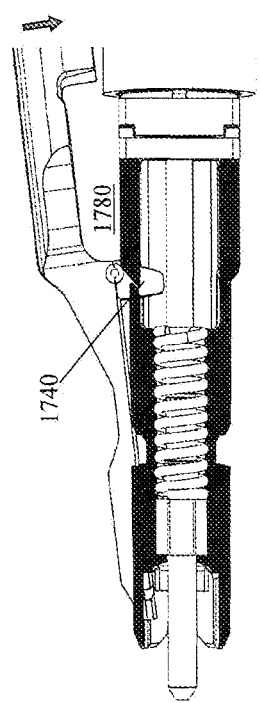
FIGS. 18A-18D depict the assembly of the push-pull tab to the connector body of the connector of FIGS. 17A-17C.
Figure 18C:
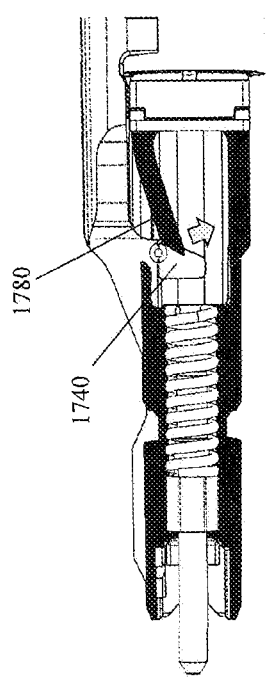
Figure 18A:
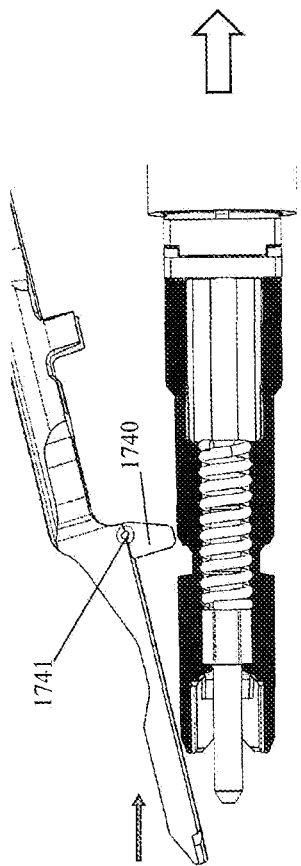
Figure 18D:
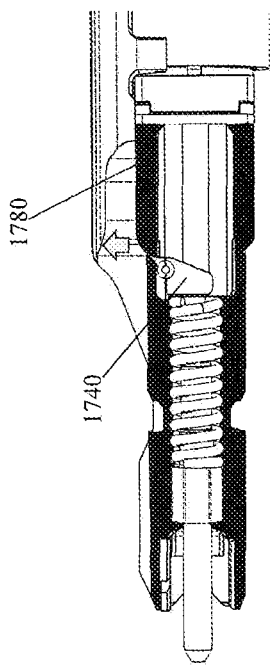

FIGS. 7B, 7C and 7D are the front view, top view and side view, respectively, of the common connector housing 720. As shown, the common connector housing may have a first exterior wall 725a positioned above the first and second optical ferrules and a second exterior wall 725b positioned beneath the first and second optical ferrules. The connector housing 720 may further have a coupling surface 724 positioned on each of the first and second exterior walls and include a receiving track 726 in the coupling surface.

FIG. 8A.1 shows the common connector housing 720 used to create a latch-type connector 700 and FIG. 8B.1 shows the common connector housing 720 used to create a recess-type connector 800. Both of connectors 700 and 800 include a removable arm 730 or 830 for engaging either of the first and second exterior wall coupling surfaces 724 on the connector housing, FIGS. 8A.2 and 8B.2 respectively. The removable arms 730 and 830 may each respectively include a projection 735 or 835 for engaging in the receiving track 726 of the coupling surface 724, FIGS. 8A.2 and 8B.2 respectively. As with the previous embodiments, positioning the removable arm on the first exterior wall of the connector housing yields a fiber optic connector with a first polarity and positioning the removable arm on the second exterior surface of the housing yields a fiber optic connector with the opposite polarity.

Still referring to FIGS. 8A.2 and 8B.2 respectively the removable arms may include either a latch or a recess: removable arm 730 includes a latch 733 while removable arm 830 includes a recess 834. Thus, a latch-type connector 700 is created through assembly of the removable latch arm to the common connector body 720 as shown in FIG. 8A.1 and a recess-type connector 800 is created through assembly of the removable recess arm to the common connector body 720 as shown in FIG. 8B.1.

The fiber optic connector may further include a pull tab. When a removable arm with a latch 730 is positioned on the coupling surface of the common connector housing 720 to create a latch-type connector 700, the pull tab 740 is a separate element from the removable arm, FIG. 8A.2. When a removable arm includes a recess 830 is positioned on the coupling surface of the common connector housing 720 to create a recess-type connector 800, the pull tab 840 is integrated with the removable arm, FIG. 8B.2.

FIGS. 9A-9D depict the process for changing the polarity of the latch-type fiber optic connector from a first polarity 700, FIG. 9A to a second polarity 700R, FIG. 9D. The sub-assembly of the removable arm 730 and the pull tab 740 may be decoupled from the coupling surface 724 of the first exterior wall of the connector housing, FIG. 9B. Then the sub-assembly of the removable arm 730 and the pull tab 740 may be coupled with the coupling surface of the second exterior wall of the connector housing, FIG. 9C, creating the opposite polarity connector 700R.

FIGS. 10A-10C depicts the process for changing the polarity of the recess-type fiber optic connector 800 from a first polarity, FIG. 10A to a second polarity, FIG. 10D. The removable arm 830 with a recess and a pull tab as an integral structure may be decoupled from the coupling surface 724 of the first exterior wall of the connector housing, FIG. 10B. Then the removable arm may be coupled with the coupling surface 724 of the second exterior wall of the common connector housing 720, FIG. 10C to create opposite polarity optical connector 800R, FIG. 10D.

FIGS. 11A and 11B depict a further embodiment 1100 of the reversible polarity optical connectors of the present disclosure. In FIG. 11A, a push-pull tab 1130 may interconnect with either a first exterior wall 1110 of housing 1105 or with a second exterior wall 1115 of housing 1105. Ferrules 1120 and 1125 are at least partially surrounded by housing 1105 and may be LC connectors in an embodiment. As in previous embodiments, the push-pull tab may include a tab recess 1145. Alternatively, push-pull tab 1130 may include a latch (not shown). Various features of the push-pull tab 1130 are provided to assist in affixing the push-pull tab to the first exterior wall 1110 or the second exterior wall 1115 of the housing 1105. This includes push-pull tab clips 1135 that clip onto the optical connector, optionally in a boot region, and protrusion 1140 that fits within a first aperture, 1109A, beneath the housing exterior wall 1110 or a second aperture, 1109B, beneath housing exterior wall 1115 (to be discussed in more detail below), and projection 1131 for inserting into the housing between ferrules 1120 and 1125. Each of these features is fully reversible such that the push-pull tab is easily removed and repositioned on the opposite exterior wall to change polarity of the connector.

As best seen in FIGS. 12B and 12D, push-pull tab protrusion 1140 may be inserted into first aperture 1109A of housing 1105 through a first exterior housing aperture 1107A. Alternatively, in the reverse-polarity configuration, the push-pull tab protrusion 1140 may be inserted into second housing aperture 1109B through second exterior housing aperture 1107B. When the push-pull tab 1130 is moved forward, the protrusion slides within the aperture 1109A or 1109B, as shown in FIG. 12B. To maintain the push-pull tab in a forward-biased position, tab position spring 1150 is provided. During insertion or removal of the protrusion 1140, tab position spring 1150 is compressed, depicted in FIG. 12B. When the position spring 1150 is in its relaxed (uncompressed) position, FIGS. 12C and 12D, the protrusion 1140 is slid forward within the aperture 1109A or 1109B.

To change polarity of the optical connector 1100, FIGS. 13A-13D, the push-pull tab 1130 is removed by withdrawing the protrusion 1140 from the housing 1105 through exterior housing aperture 1107A along with detaching clips 1135 and decoupling projection 1131, thus releasing the push-pull tab from the first exterior housing wall 1110 (FIG. 13B). The push-pull tab is moved toward second exterior housing wall 1115 and the protrusion 1140 is inserted into aperture 1109B through exterior housing aperture 1107B in FIG. 13C. Projection 1131 is fitted between ferrules 1120 and 1125 and clips 1135 are affixed to the connector. The resultant connector 1100R of 13D is of opposite polarity to the connector 1100 of FIG. 13A.

Various alternatives to the protrusion 1140 of optical connector 1100 may be used in the optical connectors of this disclosure. For example, the protrusion may be provided by the connector housing with receiving elements provided in the push-pull tab. Variations to the shape of the projection and apertures may be made without affecting the function of the reversible-polarity connector.

Another alternative embodiment is depicted in FIGS. 14A and 14B in which a hook-shaped protrusion 1440 is provided for engagement within the connector housing. As in the previous embodiment, the push-pull tab 1430 includes a tab recess 1445, connector-attachment clips 1435 and projection 1431 for positioning between ferrules 1420 and 1425. In FIG. 14B, the push-pull tab 1430 is positioned on first exterior housing wall 1410 and has a first polarity. In this position, the hook-shaped protrusion 1440 engages a housing projection 1460, held in a forward-biased position by push-pull tab position spring 1465, as seen in FIGS. 15B and 15D. To release the protrusion 1440, push-pull tab position spring 1465 is compressed in FIG. 15C such that housing projection 1460 is retracted sufficiently to allow removal of protrusion 1440 through the housing 1405, FIG. 15D.

To change polarity of the optical connector 1400 from the first polarity of FIG. 16A, the push-pull tab 1430 is removed by withdrawing the protrusion 1440 from the housing 1405 through the housing along with detaching clips 1435 and decoupling projection 1431, thus releasing the push-pull tab from the first exterior housing wall 1110 (FIG. 16B). The push-pull tab is moved toward second exterior housing wall 1415 and the protrusion 1440 is inserted into the housing 1405. Projection 1431 is fitted between ferrules 1420 and 1425 and clips 1435 are affixed to the connector in FIG. 16C. The resultant connector 1400R of FIG. 16D is of opposite polarity to the connector of FIG. 16A.

Protrusions from a push-pull tab may be inserted into a housing via features other than a housing aperture. Such a connector is depicted in FIG. 17 and features a deformable housing region to allow entry of a push-pull tab protrusion during affixing of the push-pull tab to the connector housing.

As seen in FIG. 17A, the connector 1700 includes a connector housing 1705 which may optionally include a back body housing portion 1709 for connecting with a housing front portion 1707 (FIG. 17C). The back body housing portion 1709 includes a deformable region 1780, seen in the partial cross-section of FIG. 17B and the perspective view of FIG. 17C. The push-pull tab 1730 includes a protrusion 1740 with a projection 1741 extending therefrom.

Turning to FIG. 18, to affix the push-pull tab to the connector housing, the protrusion 1740 penetrates the deformable region 1780 (FIG. 18B) causing the deformable region to yield and accept entry of the protrusion 1740 into the housing. As the projection 1741 enters the housing as depicted in FIG. 18C, the deformable region 1780 returns to its original position (FIG. 18D), securing the push-pull tab 1730 to the connector housing.

Removal of the push-pull tab 1730 is depicted in FIGS. 19A and 19B. A removal tool 1900, which may be shaped similar to a small screwdriver, depresses deformable region 1780, allowing projection 1741 to slide along an edge of the deformable region 1780, followed by the protrusion 1740, releasing the push-pull tab 1730.

To change polarity of the optical connector 1700 from the first polarity of FIG. 20A, the push-pull tab 1730 is removed in FIG. 20B by using the removal tool technique depicted in FIGS. 19A and 19B. The push-pull tab is moved toward the second exterior housing wall and the protrusion 1740 is inserted into the housing 1705 through the deformable region 1780 in FIG. 20C. The resultant connector 1700R of FIG. 20D is of opposite polarity to the connector of FIG. 20A.

In another aspect of the disclosure, a retaining member may be provided in the connector housing to retain a push-pull tab. As seen in FIGS. 21A-21D, a connector 2100 having a housing 2105 is provided with a housing front portion 2107 and a back portion 2109. FIG. 21A depicts an assembled connector 2100 with housing 2105. FIG. 21B depicts an exploded view of connector 2100 of FIG. 21A. Push-pull tab 2130 has a receiving surface 2132, which during use of connector 2100 provides a surface over which retainer 2111 can slide across during tab movement. Extending from the housing back portion is a retainer 2111 which may include a pair of retaining clips, as shown, or any other structure configured to retain the push-pull tab 2130. FIG. 21C depicts connector 2100 showing a section view cut given by the arrows and broken line near the proximal end of connector 2100. Optionally, when the retainer 2111 includes clips, the clips may be hook-shaped as seen in the cross-sectional view of FIG. 21D. As shown in FIG. 21D, receiving surface 2132 may be a recess with a protrusion along the edge that engages the hook-shaped edge of the clips.

FIG. 22A through FIG. 22E depicts the operation of polarity change for connector 2100 of FIG. 21A-FIG. 21D. FIG. 22A depicts connector 2100 with pull-push tab clips 2135 (opposing side not shown) engaged around connector. To operate connector 2100, user can move push-pull tab 2130 forward or toward front of connector or backward or toward rear of connector, and as describe in FIG. 21 above tab moves along connector receiving surface 2123. This engages or releases connector 2100 from a receptacle as is known in the art. To change the polarity of connector 2100 from the polarity depicted in FIG. 22A to the second, opposite polarity of FIG. 22E, the retainer 2111 is removed from receiving surface 2132. Referring to FIG. 21B, lifting push-pull tab 2130 in direction of up-arrow, separates retainer 2111 from receiving surface. As shown in FIG. 22C, push-pull tab clips separate from the connector as the retainer is removed. Continuing with FIG. 22C, push-pull tab 2130 is moved to the opposite housing exterior wall in FIG. 22C. FIG. 22D depicts receiving surface 2132 engages with the retainer 2111. In FIG. 21E the assembled connector 2100R having the opposite polarity to the connector of FIG. 22A is depicted, fully assembled. Retainer 2111 is in contact with receiving surface 2132, and push-pull tab 2130 is secured to connector body, as shown in FIG. 22E.

FIGS. 23-28

The following terms shall have, for the purposes of this application, the respective meanings set forth below.

A connector, as used herein, refers to a device and/or components thereof that connects a first module or cable to a second module or cable. The connector may be configured for fiber optic transmission or electrical signal transmission. The connector may be any suitable type now known or later developed, for example, embodiments of multiple-fiber push-on/pull-off (MPO) connectors, such as the Senko mini MPO connector and the Senko MPO Plus connector. The connector may generally be defined by a connector housing body.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments provide single fiber and multi-fiber connectors having a remote release tab, also referred to as a pull tab or a push pull tab. Some embodiments may be configured to allow polarity changes.

The pull tab of a typical connector may interact solely with the profile of the connector latch arm to flex the latch arm downward the distance needed to allow the connector to become unlatched from within the adapter/coupler for removal. Alternatively, the pull tab of a connector may work to solely lift an adapter hook a required distance to allow the connector to become unlatched for removal.

Various embodiments of connectors disclosed herein include an outer main body with a unique un-latching system. Various embodiments described herein generally provide optical fiber connectors with remote release tabs configured to allow a user to easily remove or insert connectors into adapters or couplers, such as adapters disposed on a high density panel without damaging surrounding connectors, accidentally disconnecting surrounding connectors, disrupting transmissions through surrounding connectors, and/or the like.

Various embodiments of connectors disclosed herein include a remote release tab having a tip configured to interact with an inner portion of the top surface of an adapter or coupler to provide some of the downward force needed to unlatch the connector from the adapter or coupler. In some embodiments, the inner portion of the top surface of the adapter or coupler may be a fixed portion that does not move.

In some embodiments, the tip of the remote release tab may be a wedge shaped tip. The connector may have a latch arm and may be configured such that as the remote release tab is pulled back, the tip of the remote release tab slides upwards along the slope of the latch arm of the connector. At a certain distance of retraction of the remote release tab, the wedge shape comes in contact with an inner portion of the top surface of the adapter. Upon additional retraction of the remote release tab, the wedge shaped tip simultaneously begins to push down the connector latch arm while sliding along the inner portion of the top surface of the adapter. As the connector latch arm is depressed to a sufficient distance, it becomes unlatched from the adapter, and any additional pulling of the remote release tab results in removing the connector from the adapter.

Some embodiments, such as embodiments having multiple ferrules and embodiments having multiple fiber ferrule connectors, are further configured to allow reversing the polarity. For example, in some embodiments, a guide of the remote release tab may be configured to rotate about 180 degrees in order to reverse polarity.

Figure 23:
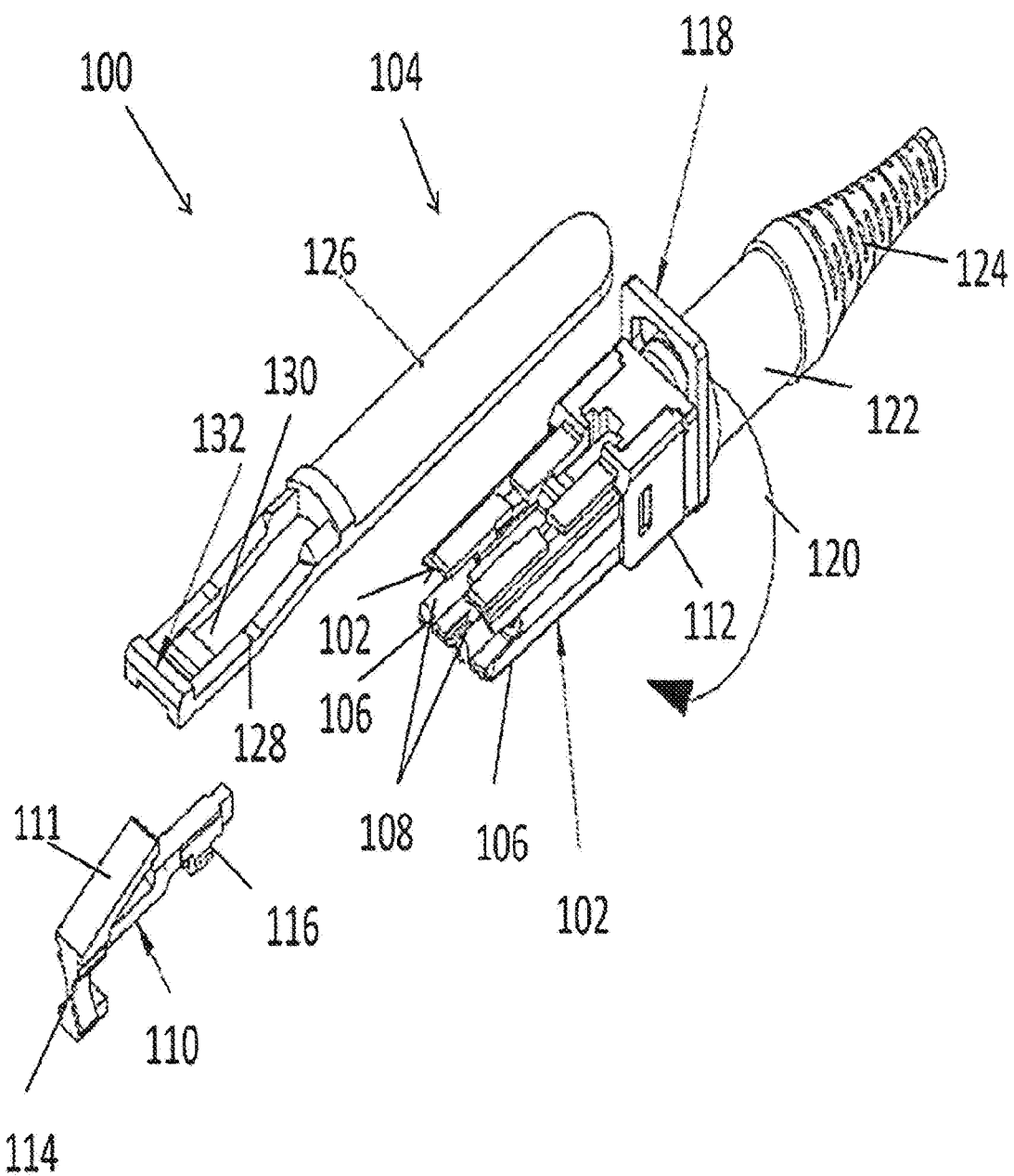
FIG. 23 is a perspective view of a partially disassembled optical fiber connector assembly having a remote release tab according to aspects of the present disclosure.

FIG. 23 shows one embodiment of an optical fiber connector assembly 3100 having a plurality of connectors 3102 and a remote release tab 3104. In this embodiment, the connector assembly 3100 has a plurality of connectors. In other embodiments, the connector assembly may have one or more connectors. Various embodiments may include connectors of different types than shown in FIG. 23. Each connector 3102 has a respective connector housing 3106 and a respective ferrule 3108.

The connector assembly 3100 further includes at least one flexible latch arm assembly 3110. The latch arm assembly 3110 includes at least one flexible latch arm 3111. The latch arm assembly 3110 is configured to couple to the connectors 3102. In other embodiments, each of the connectors 3102 may include a respective latch arm. In some embodiments, the latch arm may be formed integrally with one or more connectors in the connector assembly.

The connector assembly 3100 further includes a housing 3112 configured to receive the connectors 3102. The latch arm assembly 3110 includes a first portion 3114 configured to couple with the connectors 3102, for example by coupling to the connector housings 3106. The latch arm assembly 3110 also includes a second portion 3116 configured to be received by the housing 3112. In other embodiments, the latch arm assembly 3110 may be configured differently than shown in FIG. 23 to allow coupling to the connector assembly 3100.

The connector assembly 3100 further includes a guide 3118 configured to retain the remote release tab 3104. The guide 3118 is further configured to be rotated about 180 degrees, as shown for example by the arrow 3120, to reverse the polarity of the connector assembly 3100. In one example, the guide 3118 may be coupled to at least one polarity key, and rotation of the guide allows changing the polarity key. In another example, the polarity key may rotate with the guide. In other embodiments, the connector assembly need not be configured to reverse the polarity, and the guide may merely be configured to receive the remote release tab. The connector assembly 3100 further includes a back post 3122 and a boot 3124.

The remote release tab 3104 has a body 3126. The body 3126 may extend over the boot 3124 to facilitate remotely releasing the connector assembly from an adapter. In various embodiments, the length of the remote release tab 3104 may be selected so as to extend beyond the boot 3124 of the connector assembly 3100. For example, the length may be selected such that the handle of the remote release tab is located beyond the boot of the connector for easy access.

The body 3126 includes a coupling portion 3128 configured to couple to the connectors 3120. For example, as shown in FIG. 23, the coupling portion 3128 includes a window 3130 configured to receive at least a portion of the latch arm assembly 3110. For example, the window 3130 may be configured to receive the flexible latch arm 3111 of the connectors 3102.

The remote release tab 3104 further includes a protrusion 3132 at one end thereof. The protrusion 3132 is shaped as a wedge. In other embodiments, the protrusion 3132 may have different shapes and configurations. In various embodiments, the protrusion 3132 may be configured to slide along the latch arm 3111 of the latch arm assembly 3110 and further to interact with an adapter coupled to the connector assembly 3100, as the remote release tab 3104 is pulled rearward, to decouple the connector assembly from the adapter, as described and illustrated further below in relation to FIGS. 27 and 28.

In some embodiments, the remote release tab 3104 may be removable from the optical connector assembly 3100. The remote release tab 3104 may also be re-installed by coupling to the connector assembly 3100. For example, the guide 3118 may be configured to retain the remote release tab 3104. The guide 3118 may further be configured to allow removing the remote release tab 3104 from the connector assembly 3100.

In various embodiments, the remote release tab 3104 may have a single integral structure. In other embodiments, the remote release tab 3104 may comprise a plurality of pieces coupled together to form the remote release tab. For example, in some embodiments, the coupling portion 3128 and the protrusion 3132 may be formed integrally with the body 3126. In other embodiments, the coupling portion 3128 or the protrusion 3132 may be separate pieces coupled to each other to form the remote release tab 3104.

Figure 24:
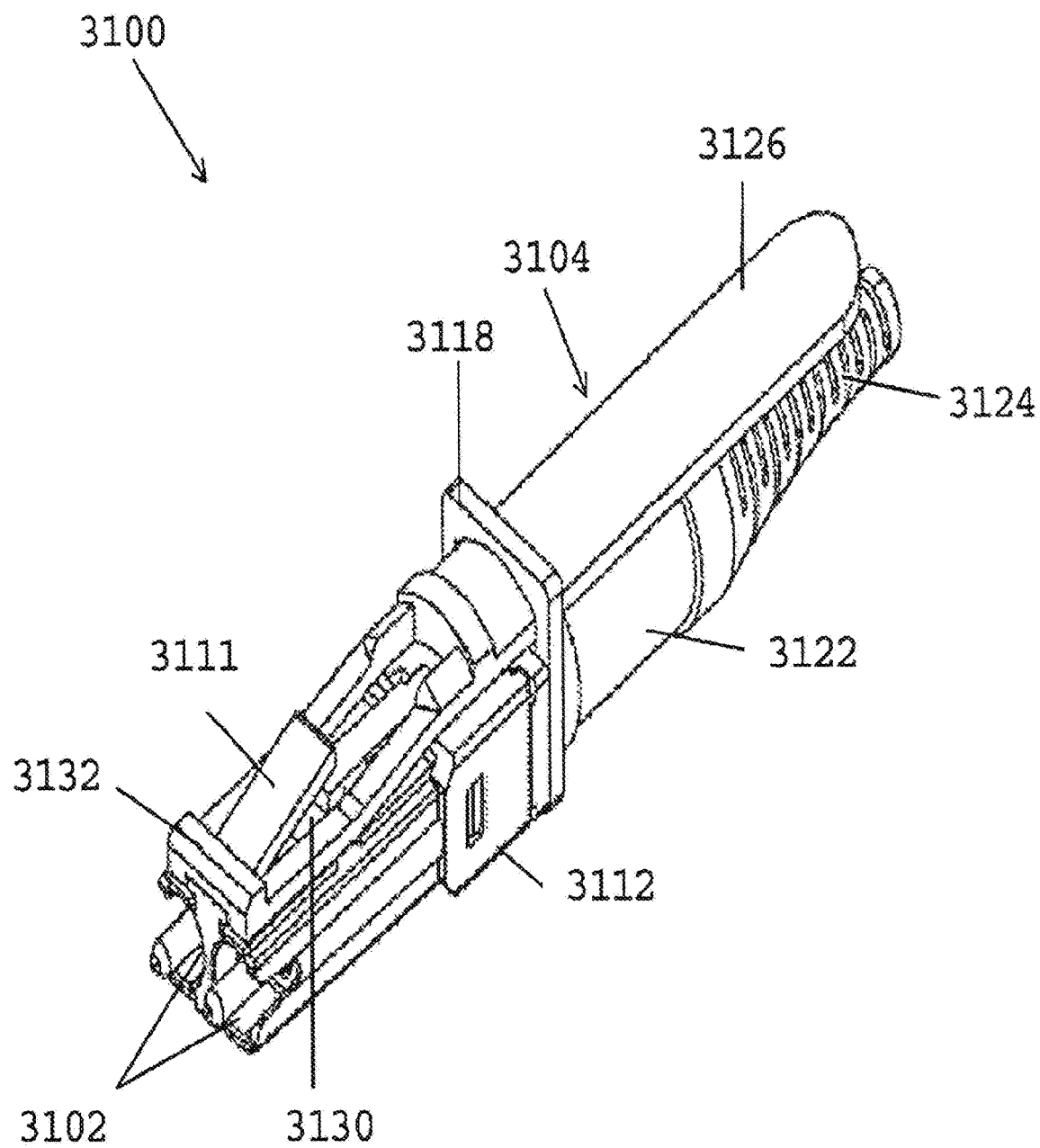
FIG. 24 is a perspective view of the optical fiber connector assembly of FIG. 23 according to aspects of the present disclosure.

FIG. 24 shows a perspective view of the assembled connector assembly 3100. As shown in FIG. 24, the latch arm 3111 protrudes through the window 3130 of the remote release tab 3104. The remote release tab 3104 is retained by the guide 3118 such that the protrusion 3132 is disposed at a front end of the connector assembly 3100 and may slide along the latch arm 3111 as the remote release tab 3104 is pulled rearward.

Figure 25:
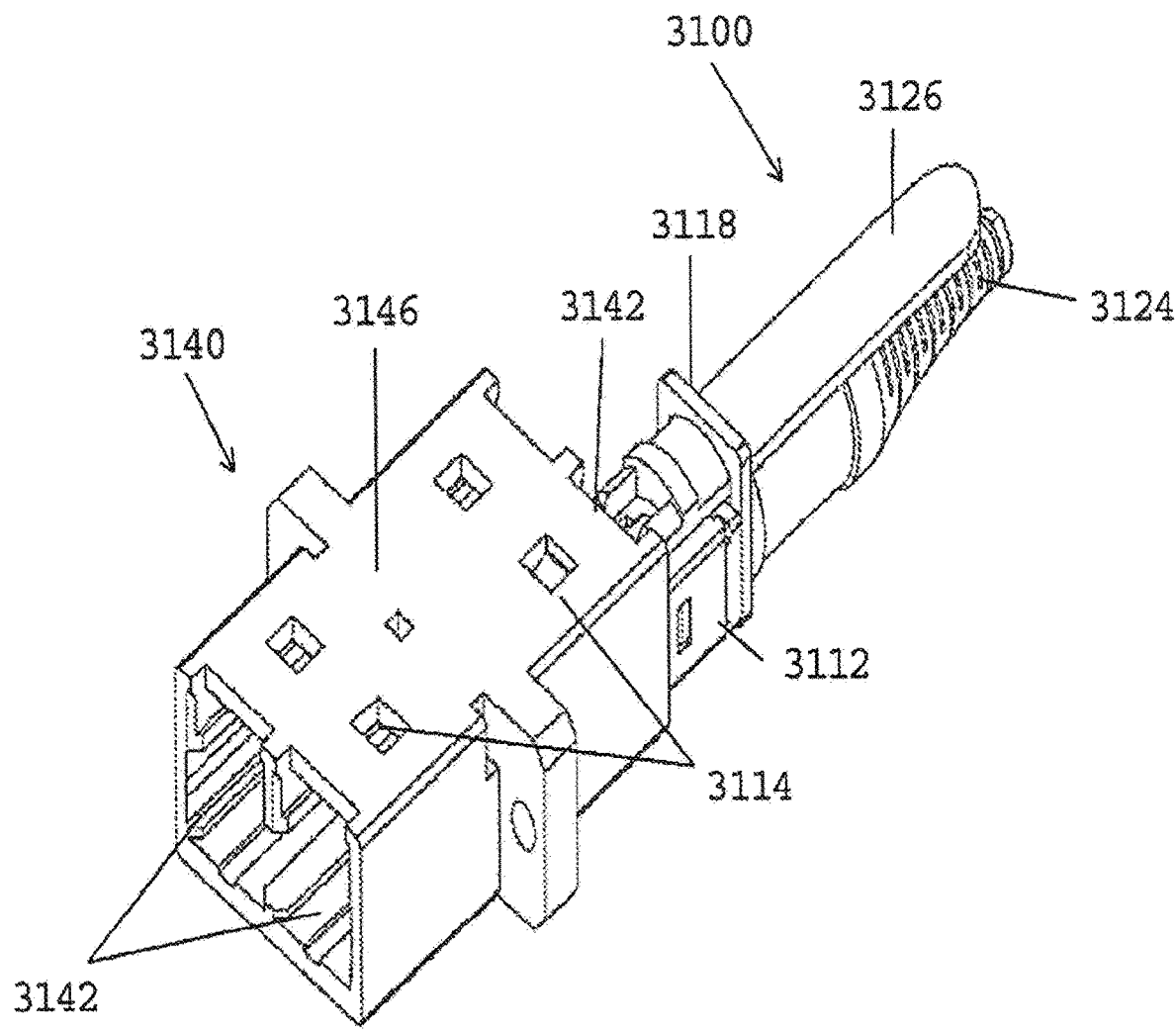
FIG. 25 is a perspective view of the optical fiber connector assembly of FIG. 23 coupled to an adapter according to aspects of the present disclosure.

FIG. 25 shows the connector assembly 3100 coupled to an adapter 3140. The adapter may have a plurality of channels 3142 configured to receive connectors, including for example the connector assembly 3100. The adapter 3140 further comprises a plurality of openings 3144 configured to couple the connector assembly to the adapter. For example, the openings 3144 are configured to engage the latch arm 3111 of the connector assembly 3100 so as to retain the connector assembly 3100 within the adapter 3140. As the remote release tab 3104 is pulled rearward, the protrusion 3132 of the remote release tab interacts with both the latch arm 3111 and the adapter 3140 to release the latch arm from an opening 3144, thereby decoupling the connector assembly 3100 from the adapter. In one embodiment, the protrusion 3132 interacts with an inner portion of a top surface 3146 of the adapter 3140.

Figure 26:
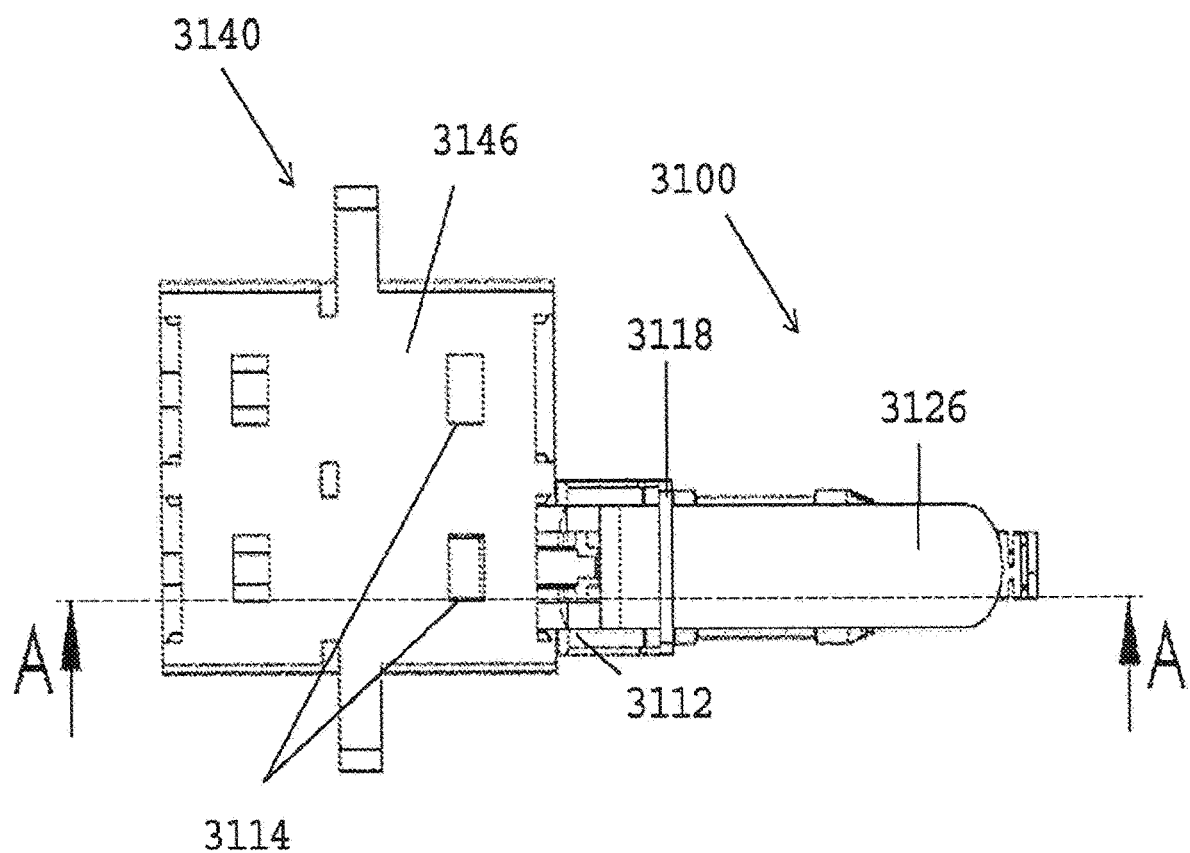
FIG. 26 is a top view of the optical fiber connector assembly and adapter of FIG. 25 according to aspects of the present disclosure.

FIG. 26 shows a top view of the adapter 3140 and the connector assembly 3100 of FIG. 25. The latch arm assembly 3110 and the connectors 3102 are received through the channels 3142 of the adapter 3140.

Figure 27:
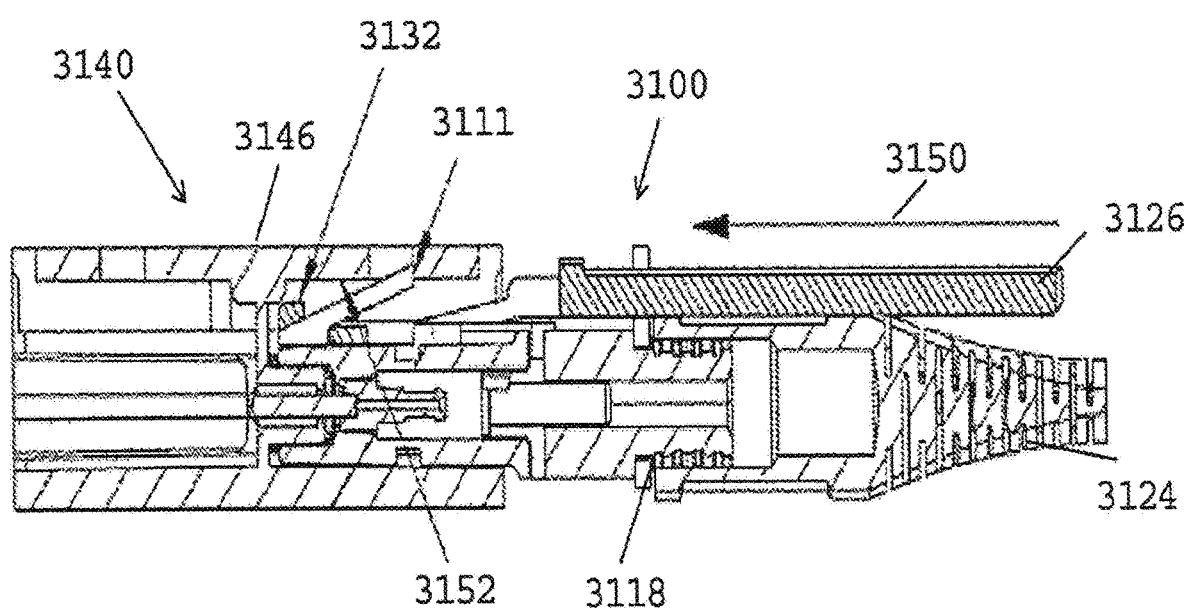
FIG. 27 is a cross-sectional view of the optical fiber connector assembly and adapter of FIG. 26 along section A-A, showing the remote release tab in a forward position according to aspects of the present disclosure.
Figure 28:
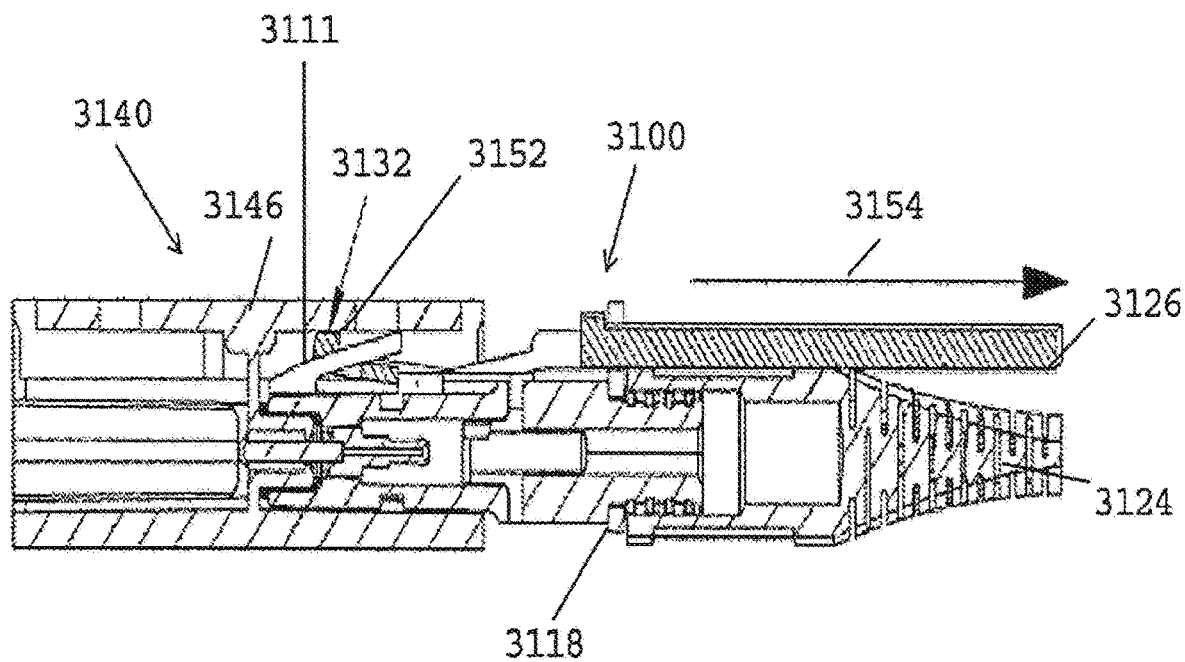
FIG. 28 is a cross-sectional view of the optical fiber connector assembly and adapter of FIG. 26 along section A-A, showing the remote release tab in a rearward position according to aspects of the present disclosure.

FIGS. 27 and 28 show a cross-sectional view of the adapter 3140 and the connector assembly 3100 of FIG. 26 along section A-A. FIG. 27 further illustrates the remote release tab 3104 in a forward position, as the connector assembly 3100 is pushed into the adapter 3140 in the direction of the arrow 3150. As shown, the connector assembly 3100 is coupled to the adapter 3140 by the latch arm 3111 which engages the opening 3144 of the adapter 3140. The opening 3144 is disposed in the top surface 3146 of the adapter 3140. The protrusion 3132 of the remote release tab 3104 is disposed at a front end of the latch arm 3111. The protrusion 3132 does not yet contact an inner portion 3152 of the top surface 3146.

FIG. 28 further illustrates the remote release tab 3104 in a rearward position as it is being pulled in the direction of the arrow 3154 so as to pull the connector assembly 3100 out of the adapter 3140. The protrusion 3132 of the remote release tab 3104 slides along the latch arm 3111 and contacts an inner portion 3152 of the top surface 3146 of the adapter 3140. The protrusion 3132 continues to slide along the inner portion 3152 of the top surface 3146 as the remote release tab 3104 is pulled further. The protrusion 3132 simultaneously begins to push down the connector latch arm 3111 while sliding rearward along the inner portion 3152 of the top surface 3146 of the adapter 3140. As the connector latch arm 3111 is depressed by the protrusion 3132, the connector assembly 3100 becomes unlatched from the adapter 3140, and any additional pulling of the remote release tab 3104 results in removing the connectors from the adapter.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. An adapter for mating with a plurality of optical fiber connectors, each of the plurality of optical fiber connectors comprising a connector housing holding multiple optical fibers, a flexible latch arm having a front end and a rear end spaced apart rearward of the front end, and a remote release comprising a front section configured to slide rearward along the flexible latch arm to depress the flexible latch arm, the adapter comprising:
an outer housing having a first end portion and a second end portion spaced apart along a longitudinal axis and a first side wall and a second side wall spaced apart along a width, the outer housing defining a plurality of channels side-by-side along the width of the outer housing, each of the plurality of channels opening through the first end portion such that the plurality of optical fiber connectors can be inserted forward along the longitudinal axis into the plurality of channels through the first end portion to mate the adapter with the plurality of optical fiber connectors for making an optical connection to the optical fibers via the adapter, the outer housing comprising an upper wall and a lower wall spaced apart along a transverse axis perpendicular to the longitudinal axis, the upper wall defining a plurality of latch openings configured to latch with the flexible latch arms of the plurality of optical fiber connectors, the plurality of channels being configured to receive the plurality of optical fiber connectors such that the front sections of the remote releases are inside the plurality of channels forward of the plurality of latch openings when the plurality of latch openings latch with the flexible latch arms;
wherein the plurality of channels includes a first channel and a second channel;
wherein the plurality of latch openings includes a first latch opening aligned with the first channel and a second latch opening aligned with the second channel;
wherein the upper wall comprises a first longitudinal rib projecting inwardly along the transverse axis toward the lower wall and the lower wall comprises a second longitudinal rib projecting inwardly along the transverse axis toward the upper wall, the first longitudinal rib and the second longitudinal rib being aligned along the width of the outer housing and located between the first and second channels, the first longitudinal rib being spaced apart from the second longitudinal rib along the transverse axis by a transverse gap, the first channel being open to the second channel through the transverse gap.

2. The adapter as set forth in claim 1, wherein each channel is configured to allow the front section of the remote release to slide rearward along the flexible latch arm within the channel to depress the flexible latch arm, wherein the upper wall of the outer housing is configured to unlatch from each flexible latch arm when the flexible latch arm is depressed, and wherein the lower wall is configured to slidably engage each connector housing without latching.

3. The adapter as set forth in claim 1, wherein the first longitudinal rib has a first height along the transverse axis and the second longitudinal rib has a second height along the transverse axis, the first height being greater than the second height.

4. The adapter as set forth in claim 1, wherein the adapter comprises a transverse wall extending between the upper wall and the lower wall at a location longitudinally spaced apart from the first end portion of the outer housing and wherein the transverse wall includes a socket configured to receive a ferrule of the optical fiber connector.

5. The adapter as set forth in claim 4, wherein the optical fiber connector is a duplex connector comprising first and second cylindrical ferrules.

6. The adapter as set forth in claim 1, wherein the optical fiber connector is a multifiber connector comprising a multifiber ferrule.

7. The adapter as set forth in claim 1,
wherein the first longitudinal rib has a bottom edge extending in a bottom edge plane parallel to the longitudinal axis and the width of the outer housing,
wherein the adapter is configured to mate with the plurality of optical fiber connectors such that parts of the remote releases are received in the plurality of channels and any portion of the remote releases received in the channels is located above the bottom edge plane,
wherein the second longitudinal rib has a top edge extending in a top edge plane parallel to the longitudinal axis and the width of the outer housing,
wherein each of the plurality of channels has an upper portion above the bottom edge plane, a lower portion below the top edge plane, and a central portion between the bottom edge plane and the top edge plane,
wherein the central portion of each channel is wider than the upper portion and the lower portion thereof,
wherein the upper wall comprises top channel surfaces defining top ends of the plurality of channels,
wherein the top channel surfaces extend in a top plane parallel to the longitudinal axis and the width of the adapter,
wherein the top plane is spaced apart above the bottom edge plane,
wherein the top channel surfaces are configured to slidably engage the front sections of the remote releases as the optical fiber connectors are inserted into the plurality of channels,
wherein the lower wall comprises bottom channel surfaces defining bottom ends of the plurality of channels,
wherein the bottom channel surfaces extend in a bottom plane parallel to the longitudinal axis and the width of the adapter,
wherein the bottom plane is spaced apart below the top edge plane,
wherein the bottom channel surfaces are configured to slidably engage bottom walls of the connector housings as the plurality of optical fiber connectors are inserted into the plurality of channels,
wherein the bottom edge plane and the top plane are spaced apart by a first height and the top edge plane and the bottom plane are spaced apart by a second height, and
wherein the first height is greater than the second height so that the upper channel portions can accommodate the front sections of the remote releases as the plurality of optical fiber connectors are inserted into the plurality of channels.

8. The adapter as set forth in claim 7, comprising a single piece forming the upper wall, the lower wall, the first side wall, the second side wall, the first alignment rib, the second alignment rib, and the transverse wall.

9. The adapter as set forth in claim 7,
wherein the adapter comprises a transverse wall between the upper wall and the lower wall at a location longitudinally spaced apart from the first end portion of the outer housing,
wherein the upper portion and the lower portion of each of the plurality of channels has a length extending along the longitudinal axis from an outer end at the first end portion of the outer housing to an inner end adjacent the transverse wall,
wherein the transverse wall closes the inner end of the upper portion and the lower portion of each of the plurality of channels,
wherein the top channel surfaces extend longitudinally from the first end portion of the outer housing to the transverse wall, and
wherein the bottom channel surfaces extend longitudinally from the first end portion of the outer housing to the transverse wall.

10. The adapter as set forth in claim 1,
wherein the first longitudinal rib has a bottom edge extending in a bottom edge plane parallel to the longitudinal axis and the width of the outer housing,
wherein the second longitudinal rib has a top edge extending in a top edge plane parallel to the longitudinal axis and the width of the outer housing,
wherein the adapter is configured to mate with the plurality of optical fiber connectors such that parts of the remote releases are received in the plurality of channels and such that any portion of the remote releases received in the channels is located above the top edge plane,
wherein each of the plurality of channels has an upper portion above the bottom edge plane, a lower portion below the top edge plane, and a central portion between the bottom edge plane and the top edge plane,
wherein the central portion of each channel is wider than the upper portion and the lower portion thereof,
wherein the upper wall comprises top channel surfaces defining top ends of the plurality of channels,
wherein the top channel surfaces extend in a top plane parallel to the longitudinal axis and the width of the adapter,
wherein the top plane is spaced apart above the bottom edge plane,
wherein the top channel surfaces are configured to slidably engage the front sections of the remote releases as the optical fiber connectors are inserted into the plurality of channels,
wherein the lower wall comprises bottom channel surfaces defining bottom ends of the plurality of channels,
wherein the bottom channel surfaces extend in a bottom plane parallel to the longitudinal axis and the width of the adapter,
wherein the bottom plane is spaced apart below the top edge plane,
wherein the bottom channel surfaces are configured to slidably engage bottom walls of the connector housings as the plurality of optical fiber connectors are inserted into the plurality of channels,
wherein the bottom edge plane and the top plane are spaced apart by a first height and the top edge plane and the bottom plane are spaced apart by a second height, and
wherein the first height is greater than the second height so that the upper channel portions can accommodate the front sections of the remote releases as the plurality of optical fiber connectors are inserted into the plurality of channels.

11. A connection system comprising:
the adapter as set forth in claim 1; and
an optical fiber connector comprising a connector housing defining a single plug frame around multiple optical fibers, a flexible latch arm having a front end and a rear end spaced apart rearward of the front end, and a remote release comprising a front section configured to slide rearward along the flexible latch arm to depress the flexible latch arm, the optical fiber connector configured to be inserted into the first channel to mate with the adapter whereby the flexible latch arm latches with the first latch opening and the front section of the remote release is inside the first channel forward of the first latch opening.

12. The connection system as set forth in claim 11,
wherein the connector housing has a first side wall, a second side wall, and a width extending from the first side wall to the second side wall, the connector housing having a top wall, a bottom wall, and a height extending from the top wall to the bottom wall,
wherein the optical fiber connector comprises a latch arm piece formed separately from the connector housing, the latch arm piece including the flexible latch arm and configured to be coupled to the connector housing,
wherein the latch arm piece includes a portion configured to be received in a recess on the top wall of the connector housing when the latch arm piece is coupled to the connector housing, the flexible latch arm extending upward from said portion,
wherein the remote release comprises a body formed separately from the connector housing and the latch arm piece and the body comprises a coupling portion configured to couple the remote release to the connector housing,
wherein the body includes a window to receive the flexible latch arm,
wherein the body is configured to couple to the top wall of the connector housing.

13. The connection system as set forth in claim 12, wherein the coupling portion comprises rails on opposite sides of the window.

14. The connection system as set forth in claim 12, wherein the body is narrower than the connector housing and located centrally on the connector housing such that the entire body is contained inside the width of the connector housing and does not protrude widthwise past the first and second side walls.

15. The connection system as set forth in claim 12, wherein the second longitudinal rib has a top edge extending in a top edge plane parallel to the longitudinal axis and the width of the outer housing, wherein the body comprises a front portion configured to be received in the first channel beside the first longitudinal rib, the entire front portion of the body being above the top edge plane when the optical fiber connector is inserted into the first channel to mate with the adapter.

16. The connection system as set forth in claim 12,
wherein the first longitudinal rib has a bottom edge extending in a bottom edge plane parallel to the longitudinal axis and the width of the outer housing,
wherein the second longitudinal rib has a top edge extending in a top edge plane parallel to the longitudinal axis and the width of the outer housing,
wherein each of the plurality of channels has an upper portion above the bottom edge plane, a lower portion below the top edge plane, and a central portion between the bottom edge plane and the top edge plane,
wherein the central portion of each channel is wider than the upper portion and the lower portion thereof,
wherein the upper wall comprises top channel surfaces defining top ends of the plurality of channels,
wherein the top channel surfaces extend in a top plane parallel to the longitudinal axis and the width of the adapter,
wherein the top plane is spaced apart above the bottom edge plane,
wherein the lower wall comprises bottom channel surfaces defining bottom ends of the plurality of channels,
wherein the bottom channel surfaces extend in a bottom plane parallel to the longitudinal axis and the width of the adapter,
wherein the bottom plane is spaced apart below the top edge plane,
wherein the bottom edge plane and the top plane are spaced apart by a first height and the top edge plane and the bottom plane are spaced apart by a second height, and
wherein the optical fiber connector comprises an upper connector portion including the flexible latch arm, the front section of the remote release, and an upper portion of the connector housing, a lower portion including a lower portion of the connector housing, and a central connector portion including a central portion of the connector housing where the multiple optical fibers are located,
wherein the central connector portion is wider than the upper connector portion and the lower connector portion, and
wherein the optical fiber connector is configured to be received in the first channel such that:
the upper connector portion is received in the upper channel portion of the first channel and latched to the upper wall of the adapter;
the lower connector portion is received in the lower channel portion of the first channel without latching;
the central connector portion is slidably received in the central channel portion of the first channel;
the front section of the remote release is received in the first channel beside the first longitudinal rib,
the front section of the remote release is received between the top wall of the connector and the top channel surface of the first channel,
the entire front section of the remote release is above the top edge plane,
a side region of the central connector portion is received in the transverse gap between the first longitudinal rib and the second longitudinal rib, and
the side region is exposed to the second channel through the transverse gap.

17. The connection system as set forth in claim 16, wherein the body and the latch arm piece form a latching assembly, and wherein the latching assembly is narrower than the connector housing and located centrally on the connector housing such that the entire latching assembly is contained inside the width of the connector housing and does not protrude widthwise past the first and second side walls.

18. The connection system as set forth in claim 16, wherein the upper connector portion has a first connector portion height corresponding to the first height and the lower connector portion has a second connector portion height corresponding to the second height, the first connector portion height being greater than the second connector portion height, wherein the transverse gap has a gap height greater than the first height, and wherein the central connector portion has a third connector portion height corresponding to the gap height, the third connector portion height greater than the first connector portion height.

* * * * *